United States Patent
Vetro

(10) Patent No.: US 6,898,241 B2
(45) Date of Patent: May 24, 2005

(54) VIDEO TRANSCODER WITH UP-SAMPLING

(75) Inventor: Anthony Vetro, Staten Island, NY (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 768 days.

(21) Appl. No.: 09/853,801

(22) Filed: May 11, 2001

(65) Prior Publication Data

US 2002/0181587 A1 Dec. 5, 2002

(51) Int. Cl.$^7$ .......................... H04N 7/12; H04N 11/02
(52) U.S. Cl. ................................ 375/240.12
(58) Field of Search ................ 348/441, 443, 348/398.1, 426.1, 449; 375/240.12, 240.16, 240.25, 240.13, 240.21, 240.03

(56) References Cited

U.S. PATENT DOCUMENTS 6,104,434 A * 8/2000 Nakagawa et al. ......... 348/403
6,201,844 B1 * 3/2001 Bailleul ..................... 375/372
6,249,549 B1 * 6/2001 Kim ..................... 375/240.21
6,310,915 B1 * 10/2001 Wells et al. ........... 375/240.03
6,647,061 B1 * 11/2003 Panusopone et al. .. 375/240.12

* cited by examiner

Primary Examiner—Chris Kelley
Assistant Examiner—Behrooz Senfi
(74) Attorney, Agent, or Firm—Dirk Brinkman; Andrew J. Curtin

(57) ABSTRACT

A method up-samples a compressed bitstream. The compressed bitstream is partially decoding to produce macroblocks. Each macroblock has DCT coefficients according to a predetermined dimensionality of the macroblock. DCT filters are applied to the DCT coefficients of each macroblock to generate up-sampled macroblocks for each macroblock, there is one up-sampled macroblock generated by each filter. Each generated up-sampled macroblock has the predetermined dimensionality.

6 Claims, 19 Drawing Sheets

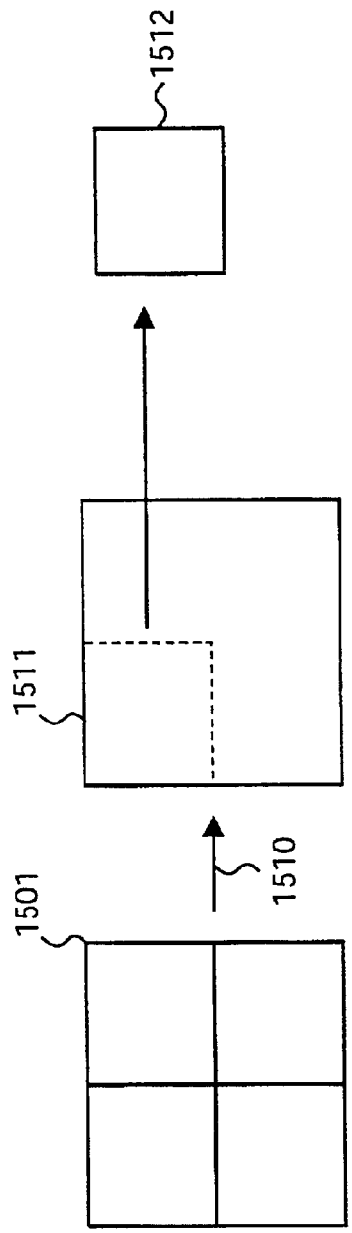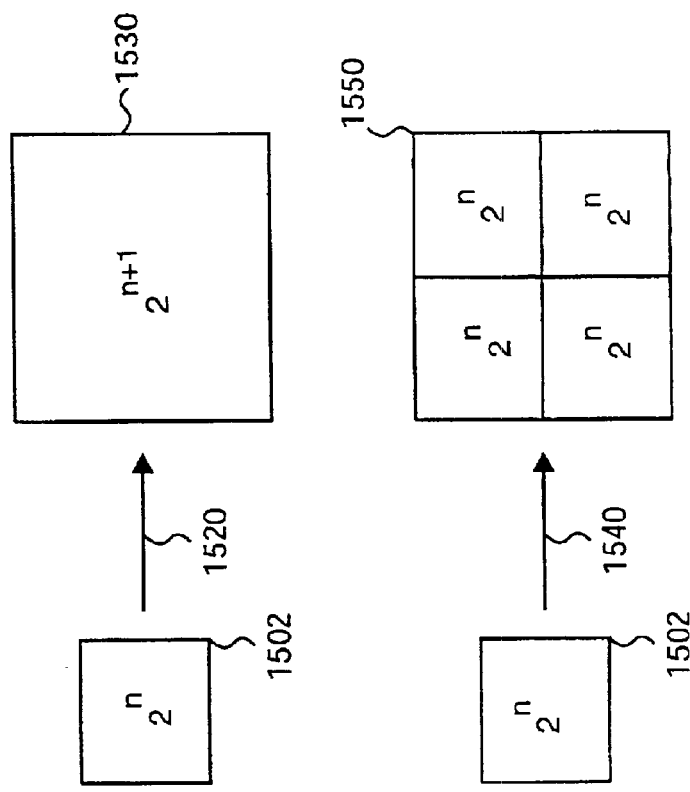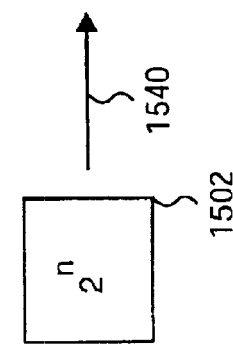
FIG. 15A PRIOR ART
FIG. 15B
FIG. 15C

VIDEO TRANSCODER WITH UP-SAMPLING

FIELD OF THE INVENTION

This invention relates generally to the field of transcoding bitstreams, and more particularly up-sampling while transcoding video bitstreams.

BACKGROUND OF THE INVENTION

Video compression enables the storing, transmitting, and processing of visual information with fewer storage, network, and processor resources. The most widely used video compression standards include MPEG-1 for storage and retrieval of moving pictures, MPEG-2 for digital television, and H.263 for video conferencing, see ISO/IEC 11172-2:1993, "Information Technology—Coding of Moving Pictures and Associated Audio for Digital Storage Media up to about 1.5 Mbit/s—Part 2: Video," D. LeGall, "MPEG: A Video Compression Standard for Multimedia Applications," Communications of the ACM, Vol. 34, No. 4, pp. 46–58, 1991, ISO/IEC 13818-2:1996, "Information Technology—Generic Coding of Moving Pictures and Associated Audio Information—Part 2: Video," 1994, ITU-T SG XV, DRAFT H.263, "Video Coding for Low Bitrate Communication," 1996, ITU-T SG XVI, DRAFT13 H.263+ Q15-A-60 rev.0, "Video Coding for Low Bitrate Communication," 1997.

These standards are relatively low-level specifications that primarily deal with a spatial compression of images or frames, and the spatial and temporal compression of sequences of frames. As a common feature, these standards perform compression on a per frame basis. With these standards, one can achieve high compression ratios for a wide range of applications.

Newer video coding standards, such as MPEG-4 for multimedia applications, see ISO/IEC 14496-2:1999, "Information technology—coding of audio/visual objects, Part 2: Visual," allow arbitrary-shaped objects to be encoded and decoded as separate video object planes (VOP). The objects can be visual, audio, natural, synthetic, primitive, compound, or combinations thereof. Also, there is a significant amount of error resilience features built into this standard to allow for robust transmission across error-prone channels, such as wireless channels.

The emerging MPEG-4 standard is intended to enable multimedia applications, such as interactive video, where natural and synthetic materials are integrated, and where access is universal. In the context of video transmission, these compression standards are needed to reduce the amount of bandwidth on networks. The networks can be wireless or the Internet. In any case, the network has limited capacity, and contention for scarce resources should be minimized.

A great deal of effort has been placed on systems and methods that enable devices to transmit the content robustly and to adapt the quality of the content to the available network resources. When the content is encoded, it is sometimes necessary to further decode the bitstream before it can be transmitted through the network at a lower bit-rate or resolution.

As shown in FIG. 1, this can be accomplished by a transcoder 100. In a simplest implementation, the transcoder 100 includes a cascaded decoder 110 and encoder 120. A compressed input bitstream 101 is fully decoded at an input bit-rate $R_{in}$, then encoded at an output bit-rate $R_{out}$ 102 to produce the output bitstream 103. Usually, the output rate is lower than the input rate. In practice, full decoding and full encoding in a transcoder is not done due to the high complexity of encoding the decoded bitstream.

Earlier work on MPEG-2 transcoding has been published by Sun et al., in "Architectures for MPEG compressed bitstream scaling," IEEE Transactions on Circuits and Systems for Video Technology, April 1996. There, four methods of rate reduction, with varying complexity and architecture, were described.

FIG. 2 shows a first example method 200, which is referred to as an open-loop architecture. In this architecture, the input bitstream 201 is only partially decoded. More specifically, macroblocks of the input bitstream are variable-length decoded (VLD) 210 and inverse quantized 220 with a fine quantizer $Q_1$, to yield discrete cosine transform (DCT) coefficients. Given the desired output bit-rate 202, the DCT blocks are a re-quantized by a coarser level quantizer $Q_2$ of the quantizer 230. These re-quantized blocks are then variable-length coded (VLC) 240, and a new output bitstream 203 at a lower rate is formed. This scheme is much simpler than the scheme shown in FIG. 1 because the motion vectors are re-used and an inverse DCT operation is not needed. Note, here the choice of $Q_1$ and $Q_2$ strictly depend on rate characteristics of the bitstream. Other factors, such as possibly, spatial characteristics of the bitstream are not considered.

FIG. 3 shows a second example method 300. This method is referred to as a closed-loop architecture. In this method, the input video bitstream is again partially decoded, i.e., macroblocks of the input bitstream are variable-length decoded (VLD) 310, and inverse quantized 320 with $Q_1$ to yield discrete cosine transform (DCT) coefficients 321. In contrast to the first example method described above, correction DCT coefficients 332 are added 330 to the incoming DCT coefficients 321 to compensate for the mismatch produced by re-quantization. This correction improves the quality of the reference frames that will eventually be used for decoding. After the correction has been added, the newly formed blocks are re-quantized 340 with $Q_2$ to satisfy a new rate, and variable-length coded 350, as before. Note, again $Q_1$ and $Q_2$ are rate based.

To obtain the correction component 332, the re-quantized DCT coefficients are inverse quantized 360 and subtracted 370 from the original partially decoded DCT coefficients. This difference is transformed to the spatial domain via an I inverse DCT (IDCT) 365 and stored into a frame memory 380. The motion vectors 381 associated with each incoming block are then used to recall the corresponding difference blocks, such as in motion compensation 290. The corresponding blocks are then transformed via the DCT 332 to yield the correction component. A derivation of the method shown in FIG. 3 is described in "A frequency domain video transcoder for dynamic bit-rate reduction of MPEG-2 bitstreams," by Assuncao et al., IEEE Transactions on Circuits and Systems for Video Technology, pp. 953–957, 1998.

Assuncao et al. also described an alternate method for the same task. In the alternative method, they used a motion compensation (MC) loop operating in the frequency domain for drift compensation. Approximate matrices were derived for fast computation of the MC blocks in the frequency domain. A Lagrangian optimization was used to calculate the best quantizer scales for transcoding. That alternative method removed the need for the IDCT/DCT components.

According to prior art compression standards, the number of bits allocated for encoding texture information is controlled by a quantization parameter (QP). The above methods are similar in that changing the QP based on information that is contained in the original bitstream reduces the rate of texture bits. For an efficient implementation, the information is usually extracted directly from the compressed domain and can include measures that relate to the motion of macroblocks or residual energy of DCT blocks. The methods describes above are only applicable for bit-rate reduction.

Besides bit-rate reduction, other types of transformation of the bitstream can also be performed. For example, object-based transformations have been described in U.S. patent application Ser. No. 09/504,323, "Object-Based Bitstream Transcoder," filed on Feb. 14, 2000 by Vetro et al. Transformations on the spatial resolution have been described in "Heterogeneous video transcoding to lower spatio-temporal resolutions, and different encoding formats," IEEE Transaction on Multimedia, June 2000, by Shanableh and Ghanbari.

It should be noted these methods produce bitstreams at a reduced spatial resolution reduction that lack quality, or are accomplished with high complexity. Also, proper consideration has not been given to the means by which reconstructed macroblocks are formed. This can impact both the quality and complexity, and is especially important when considering reduction factors different than two. Moreover, these methods do not specify any architectural details. Most of the attention is spent on various means of scaling motion vectors by a factor of two.

FIG. 4 shows the details of a method 400 for transcoding an input bitstream to an output bitstream 402 at a lower spatial resolution. This method is an extension of the method shown in FIG. 1, but with the details of the decoder 110 and encoder 120 shown, and a down-sampling block 410 between the decoding and encoding processes. The decoder 110 performs a partial decoding of the bitstream. The down-sampler reduces the spatial resolution of groups of partially macroblocks. Motion compensation 420 in the decoder uses the full-resolution motion vectors $mv_f$ 421, while motion compensation 430 in the encoder uses low-resolution motion vectors $mv_r$ 431. The low-resolution motion vectors are either estimated from the down-sampled spatial domain frames $y_n^1$ 403, or mapped from the full-resolution motion vectors. Further detail of the transcoder 400 are described below.

FIG. 5 shows the details of an open-loop method 500 for transcoding an input bitstream 501 to an output bitstream 502 at a lower spatial resolution. In this method, the video bitstream is again partially decoded, i.e., macroblocks of the input bitstream are variable-length decoded (VLD) 510 and inverse quantized 520 to yield discrete cosine transform (DCT) coefficients, these steps are well known.

The DCT macroblocks are then down-sampled 530 by a factor of two by masking the high frequency coefficients of each 8×8 ($2^3 \times 2^3$) luminance block in the 16×16 ($2^4 \times 2^4$) macroblock to yield four 4×4 DCT blocks, see U.S. Pat. No. 5,262,854, "Low-resolution HDTV receivers," issued to Ng on Nov. 16, 1993. In other words, down-sampling turns a group of blocks, for example four, into a group of four blocks of a smaller size.

By performing down-sampling in the transcoder, the transcoder must take additional steps to re-form a compliant 16×16 macroblock, which involves transformation back to the spatial domain, then again to the DCT domain. After the down-sampling, blocks are re-quantized 540 using the same quantization level, and then variable length coded 550. No methods have been described to perform rate control on the reduced resolution blocks.

To perform motion vector mapping 560 from full 559 to reduced 561 motion vectors, several methods suitable for frame-based motion vectors have been described in the prior art. To map from four frame-based motion vectors, i.e., one for each macroblock in a group, to one motion vector for the newly formed 16×16 macroblock, simple averaging or median filters can be applied. This is referred to as a 4:1 mapping.

However, certain compression standards, such as MPEG-4 and H.263, support advanced prediction modes that allow one motion vector per 8×8 block. In this case, each motion vector is mapped from a 16×16 macroblock in the original resolution to an 8×8 block in the reduced resolution macroblock. This is referred to as a 1:1 mapping.

FIG. 6 shows possible mappings 600 of motion vector from a group of four 16×16 macroblocks 601 to either one 16×16 macroblock 602 or four 8×8 macroblocks 603. It is inefficient to always use the 1:1 mapping because more bits are used to code four motion vectors. Also, in general, the extension to field-based motion vectors for interlaced images is non-trivial. Given the down-sampled DCT coefficients and mapped motion vectors, the data are subject to variable length coding and the reduced resolution bitstream can be formed as is well known.

It is desired to provide a method for transcoding bitstreams that overcomes the problems of the prior art methods for spatial resolution reduction. Furthermore, it is desired to provide a balance between complexity and quality in the transcoder. Furthermore it is desired to compensate for drift, and provide better up-sampling techniques during the transcoding.

SUMMARY OF THE INVENTION

A method up-samples a compressed bitstream. The compressed bitstream is partially decoding to produce macroblocks. Each macroblock has DCT coefficients according to a predetermined dimensionality of the macroblock. DCT filters are applied to the DCT coefficients of each macroblock to generate up-sampled macroblocks for each macroblock, there is one up-sampled macroblock generated by each filter. Each generated up-sampled macroblock has the predetermined dimensionality.

BRIEF DESCRIPTION OF THE DRAWINGS

FIG. 15A illustrates a prior art concept of down-sampling in the DCT or spatial domain;

FIG. 15B is a block diagram of prior art up-sampling in the DCT or spatial domain;

FIG. 15C is a block diagram of up-sampling in the DCT domain according to the invention.

DETAILED DESCRIPTION OF PREFERRED EMBODIMENTS

Introduction

The invention provides a system and method for transcoding compressed bitstreams of digital video signals to a reduced spatial resolution with minimum drift. First, several applications for content distribution that can use the transcoder according to the invention are described. Next, an analysis of a basic method for generating a bitstream at a lower spatial resolution is provided. Based on this analysis, several alternatives to the base method and the corresponding architectures that are associated with each alternative are described.

Figure 9:
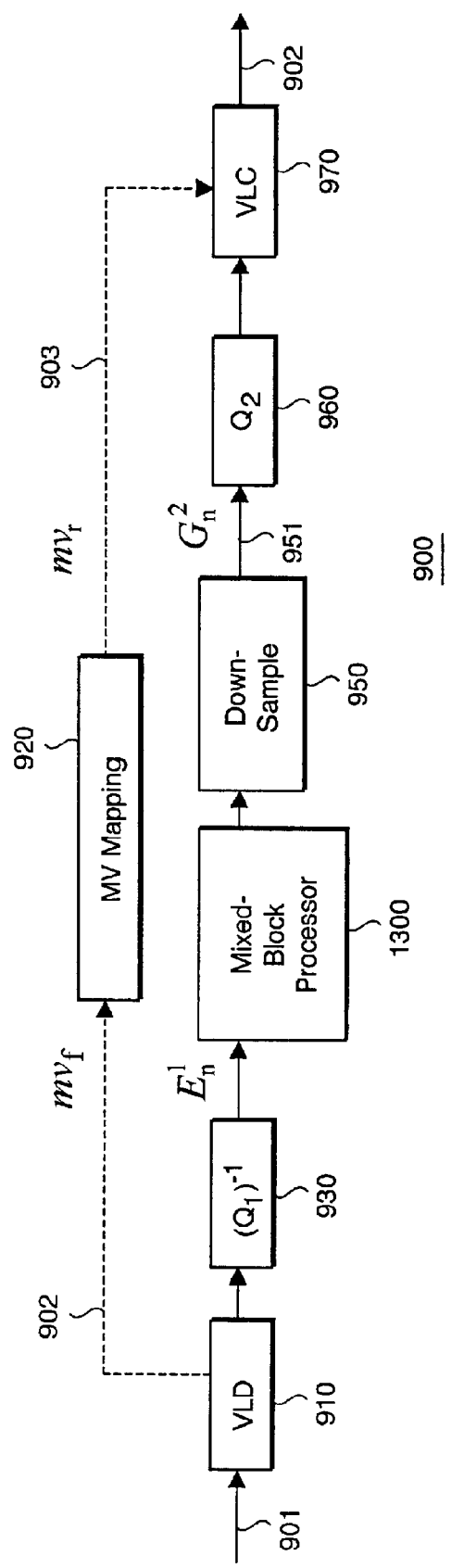
FIG. 9 is a block diagram of an open-loop transcoder for spatial resolution reduction according to the invention.
Figure 10:
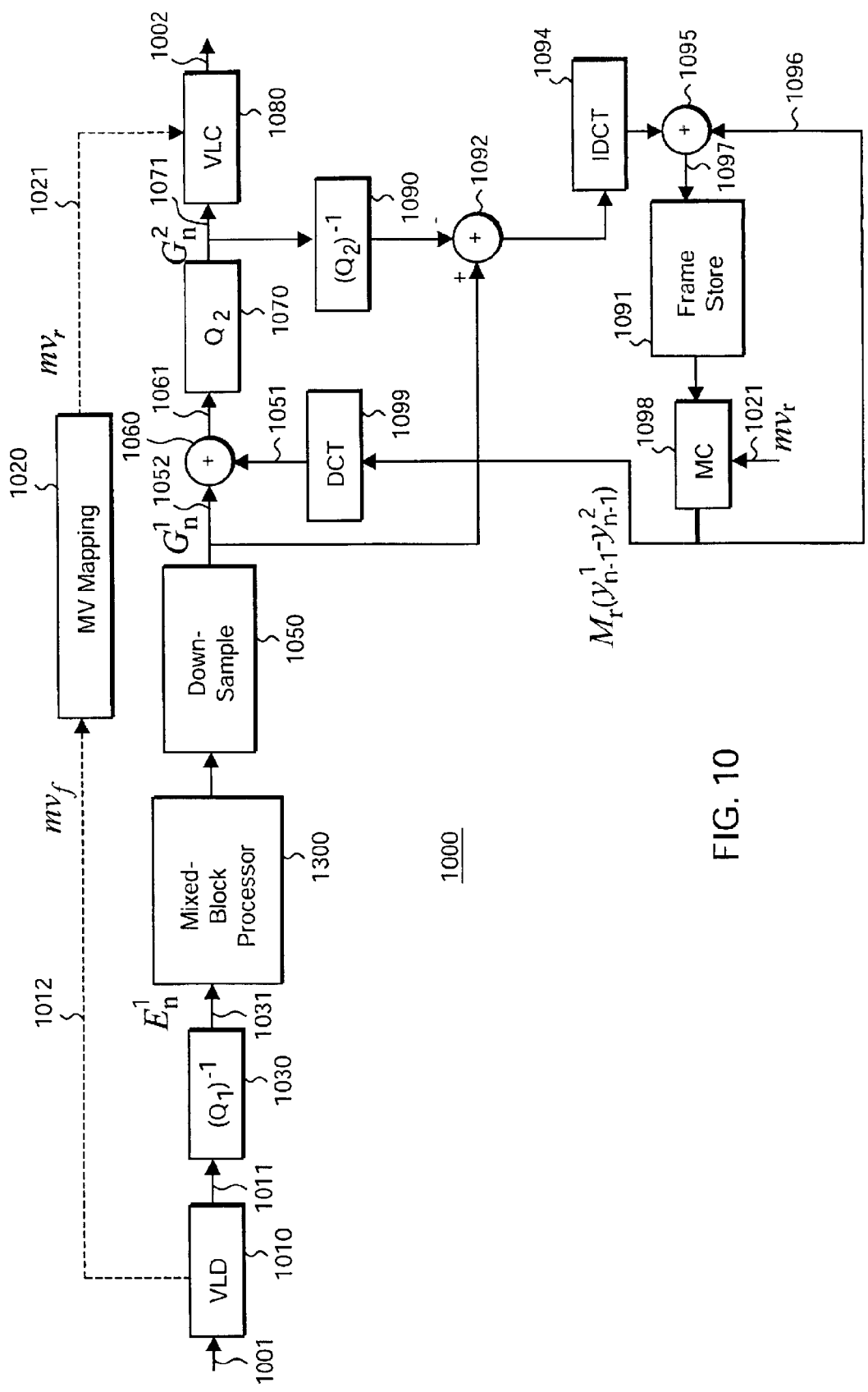
FIG. 10 is a block diagram of a first closed-loop transcoder for spatial resolution reduction with drift compensation in the reduced resolution according to the invention.
Figure 11A:
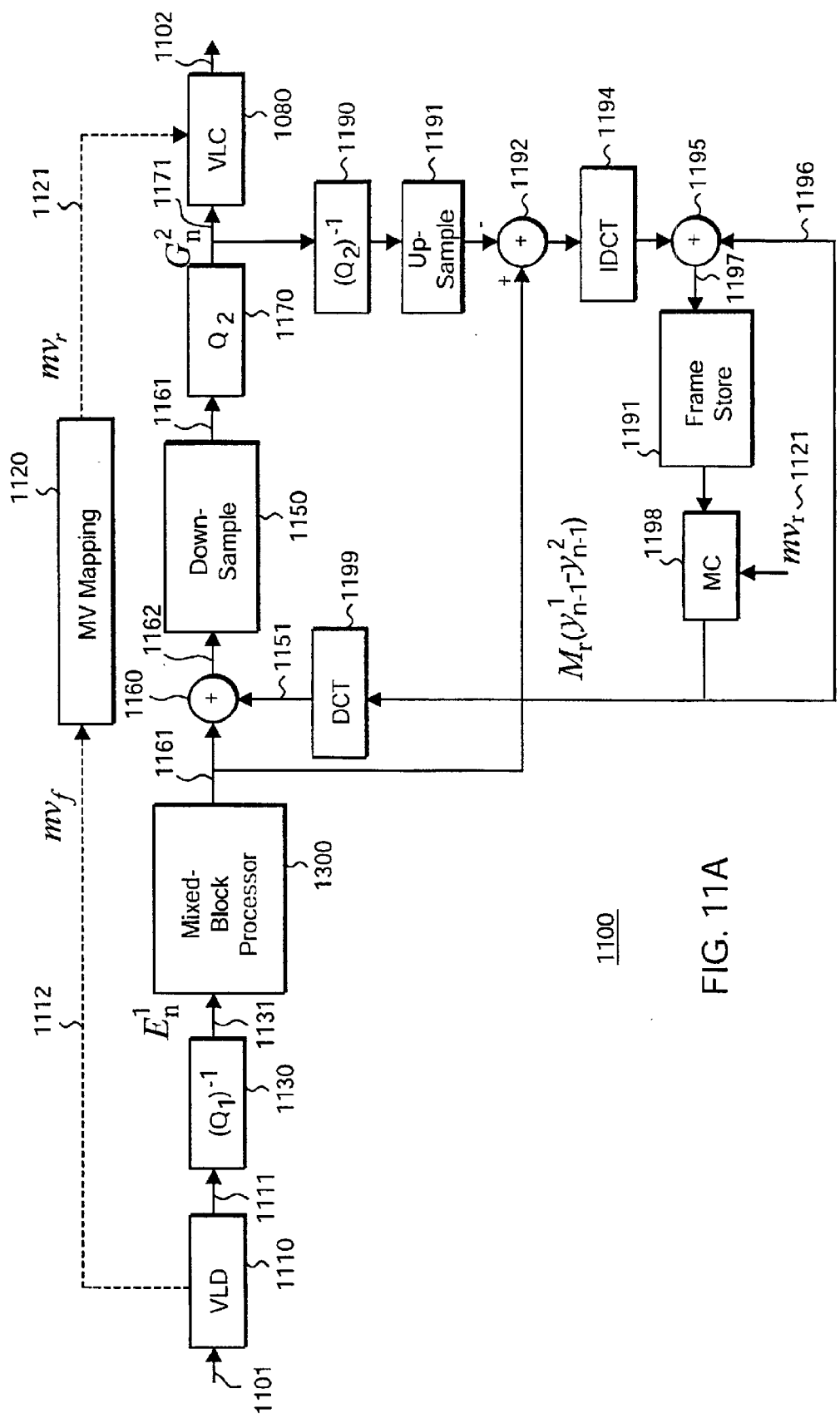
FIG. 11a is a block diagram of a second closed-loop transcoder for spatial resolution reduction with drift compensation in the original resolution according to the invention.
Figure 11B:
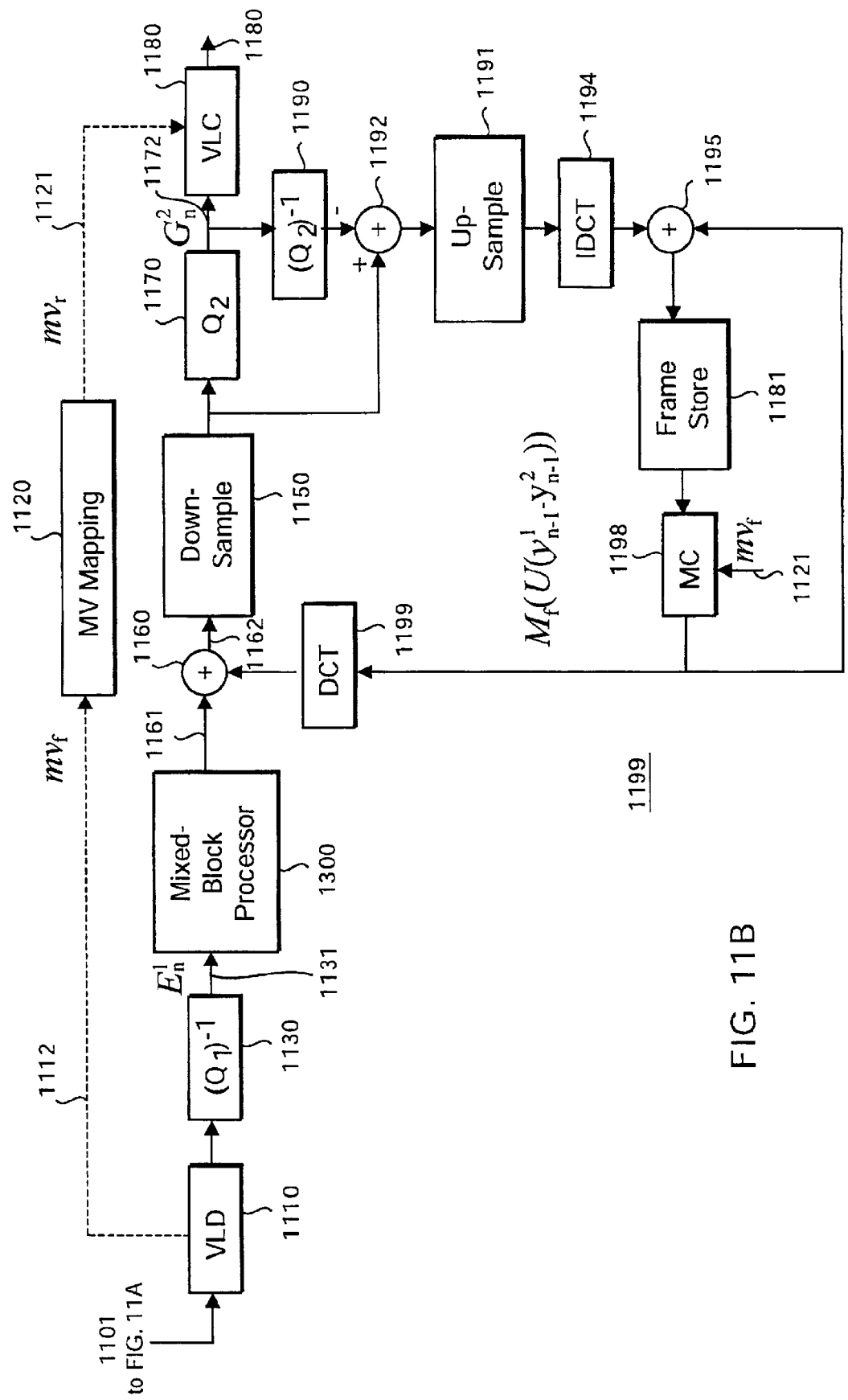
FIG. 11b is a block diagram of a third closed-loop transcoder for spatial resolution reduction with drift compensation in the original resolution according to the invention.

A first alternative, see FIG. 9, uses an open-loop architecture, while the other three alternatives, FIGS. 10 and 11a–b, correspond to closed-loop architectures that provide a means of compensating drift incurred by down-sampling, re-quantization and motion vector truncation. One of the closed-loop architectures performs this compensation in the reduced resolution, while the others perform this compensation in the original resolution in the DCT domain for better quality.

As will be described in greater detail below, the open-loop architecture of FIG. 9 is of low complexity. There is no reconstruction loop, no DCT/IDCT blocks, no frame store, and the quality is reasonable for low picture resolution, and bit-rates. This architecture is suitable for Internet applications and software implementations. The first closed-loop architecture of FIG. 10 is also of moderate complexity. It includes a reconstruction loop, IDCT/DCT blocks, and a frame store. Here, the quality can be improved with drift compensation in reduced resolution domain. The second closed-loop architecture of FIG. 11a is of moderate complexity. It includes a reconstruction loop, IDCT/DCT blocks, and a frame store. The quality can be improved with drift compensation in the original resolution domain, and does require up-sampling of the reduced resolution frames. The third closed loop architecture uses a correction signal obtained in the reduced resolution domain.

To support the architectures according to the present invention, several additional techniques for processing blocks that would otherwise have groups of macroblock with "mixed" modes at the reduced resolution are also described.

A group of blocks, e.g., four, to be down-sampled is considered a "mixed" block when the group of blocks to be down-sampled contains blocks coded in both intra- and inter-modes. In the MPEG standards I-frames contain only macroblocks coded according to the intra-mode, and P-frames can include intra- and inter-mode coded blocks. These modes need to be respected, particularly while down-sampling, otherwise the quality of the output can be degraded.

Also, methods for drift-compensation and up-sampling DCT based data are described. These methods are useful for the second and third closed-loop architectures so that operations after the up-sampling can be performed properly and without additional conversion steps.

Applications for Reduced Spatial Resolution Transcoding

The primary target application for the present invention is the distribution of digital television (DTV) broadcast and Internet content to devices with low-resolution displays, such as wireless telephones, pagers, and personal digital assistance. MPEG-2 is currently used as the compression format for DTV broadcast and DVD recording, and MPEG-1 content is available over the Internet.

Because MPEG-4 has been adopted as the compression format for video transmission over mobile networks, the present invention deals with methods for transcoding MPEG-½ content to lower resolution MPEG-4 content.

Figure 7:
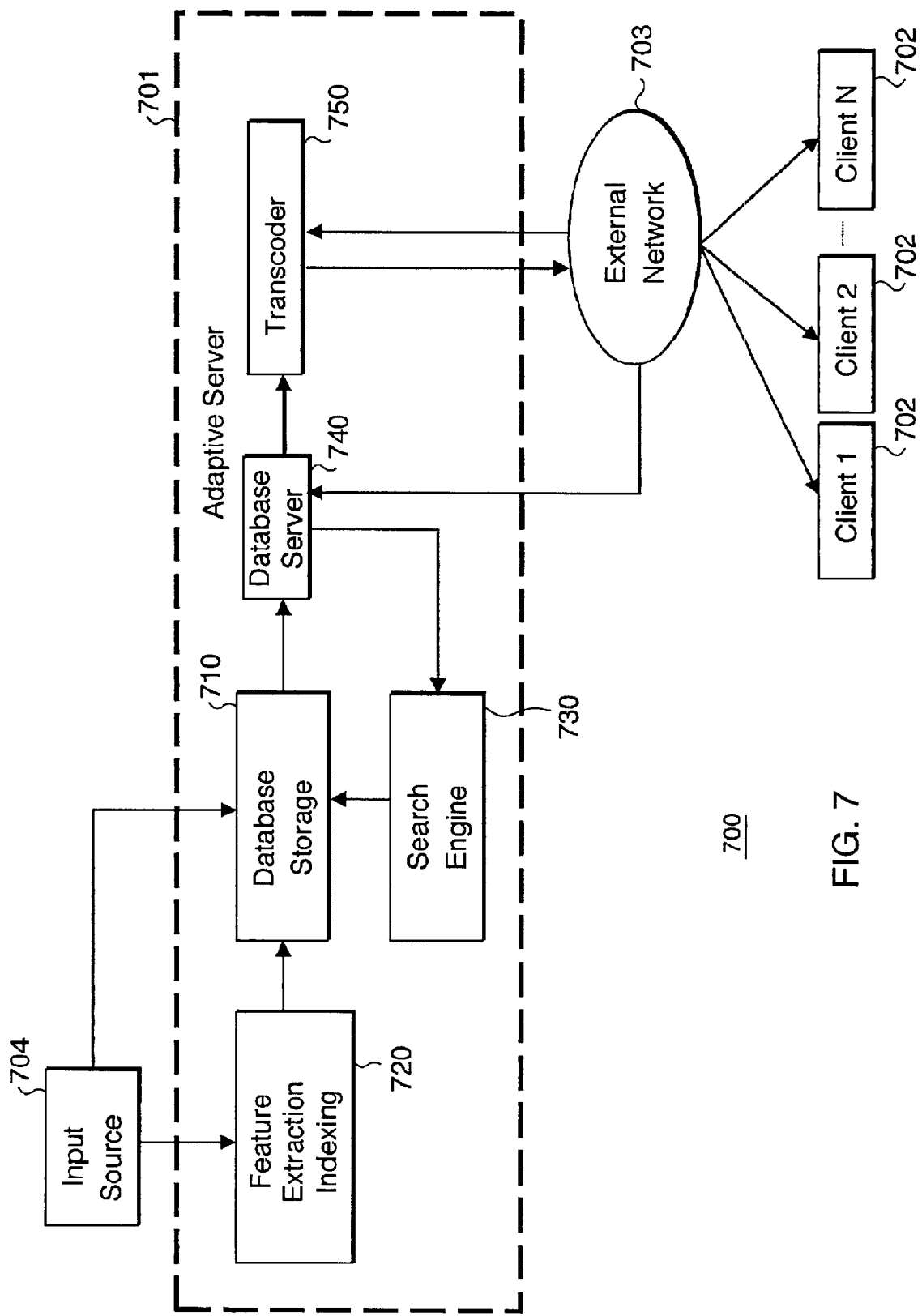
FIG. 7 is a block diagram of a first application transcoding a bitstream to a reduced spatial resolution according to the invention.

FIG. 7 shows a first example of a multimedia content distribution system 700 that uses the invention. The system 700 includes an adaptive server 701 connected to clients 702 via an external network 703. As a characteristics the clients have small-sized displays or are connected by low bit-rate channels. Therefore, there is a need to reduce the resolution of any content distributed to the clients 702.

Input source multimedia content 704 is stored in a database 710. The content is subject to a feature extraction and an indexing process 720. A database server 740 allows the clients 702 to browse the content of the database 710 and to make requests for specific content. A search engine 730 can be used to locate multimedia content. After the desired content has been located, the database server 740 forwards the multimedia content to a transcoder 750 according to the invention.

The transcoder 750 reads network and client characteristics. If the spatial resolution of the content is higher than the display characteristics of the client, then the method according to the invention is used to reduce the resolution of the content to match the display characteristics of the client. Also, if the bit-rate on the network channel is less than the bit-rate of the content, the invention can also be used.

Figure 8:
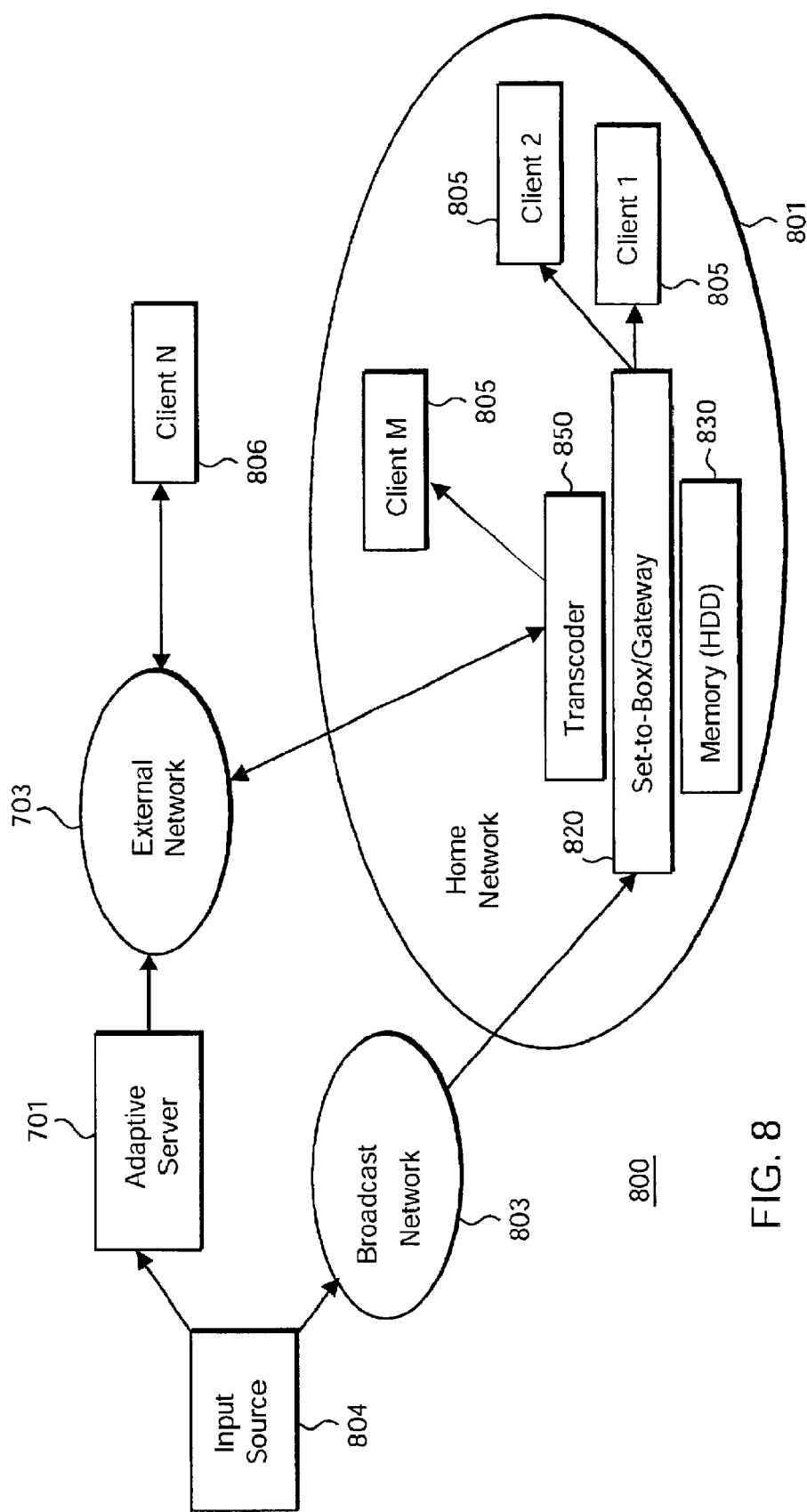
FIG. 8 is a block diagram of a second application transcoding a bitstream to a reduced spatial resolution according to the invention.

FIG. 8 shows a second example of a content distribution system 800. The system 800 includes a local "home" network 801, the external network 703, a broadcast network 803, and the adaptive server 701 as described for FIG. 7. In this application, high-quality input source content 804 can be transported to clients 805 connected to the home network 801 via the broadcast network 803, e.g., cable, terrestrial or satellite. The content is received by a set-top box or gateway 820 and stored into a local memory or hard-disk drive (HDD) 830. The received content can be distributed to the clients 805 within the home. In addition, the content can be transcoded 850 to accommodate any clients that do not have the capability to decode/display the full resolution content. This can be the case when a high-definition television (HDTV) bitstream is received for a standard-definition television set. Therefore, the content should be transcoded to satisfy client capabilities within the home.

Moreover, if access to the content stored on the HDD 830 is desired by a low-resolution external client 806 via the external network 802, then the transcoder 850 can also be used to deliver low-resolution multimedia content to this client.

Analysis of Base Method

Figure 1:
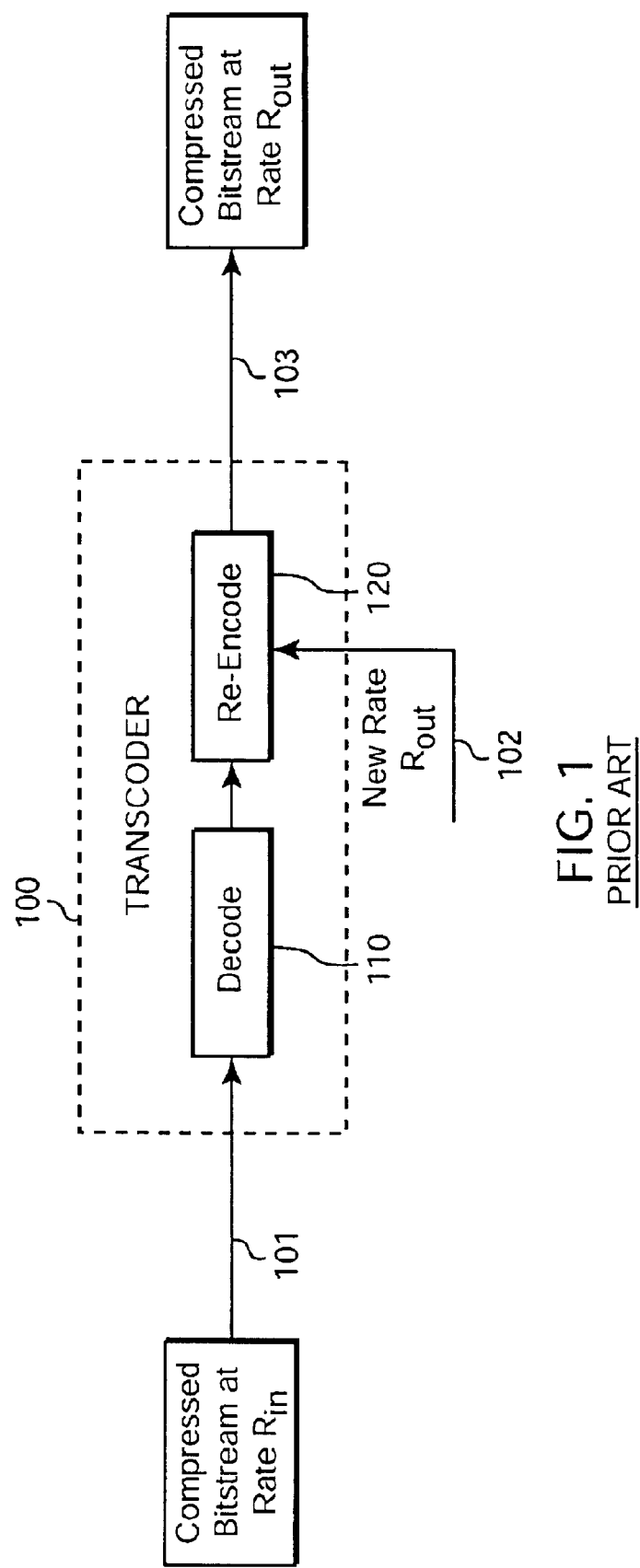
FIG. 1 is a block diagram of a prior art cascaded transcoder.
Figure 2:
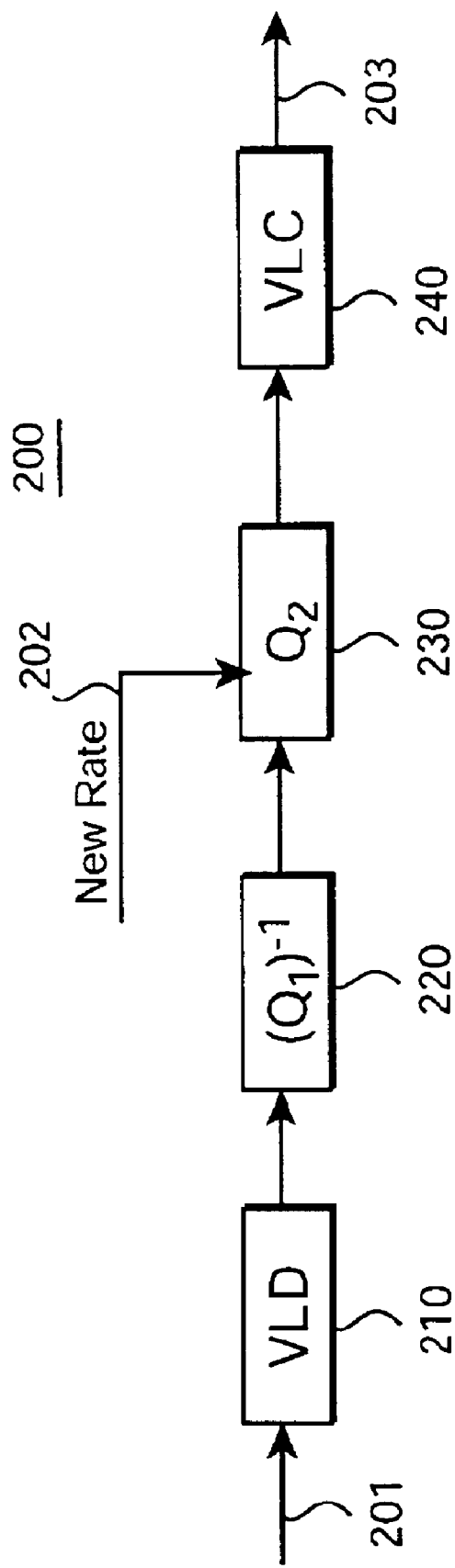
FIG. 2 is a block diagram of a prior art open-loop transcoder for bit-rate reduction.
Figure 3:
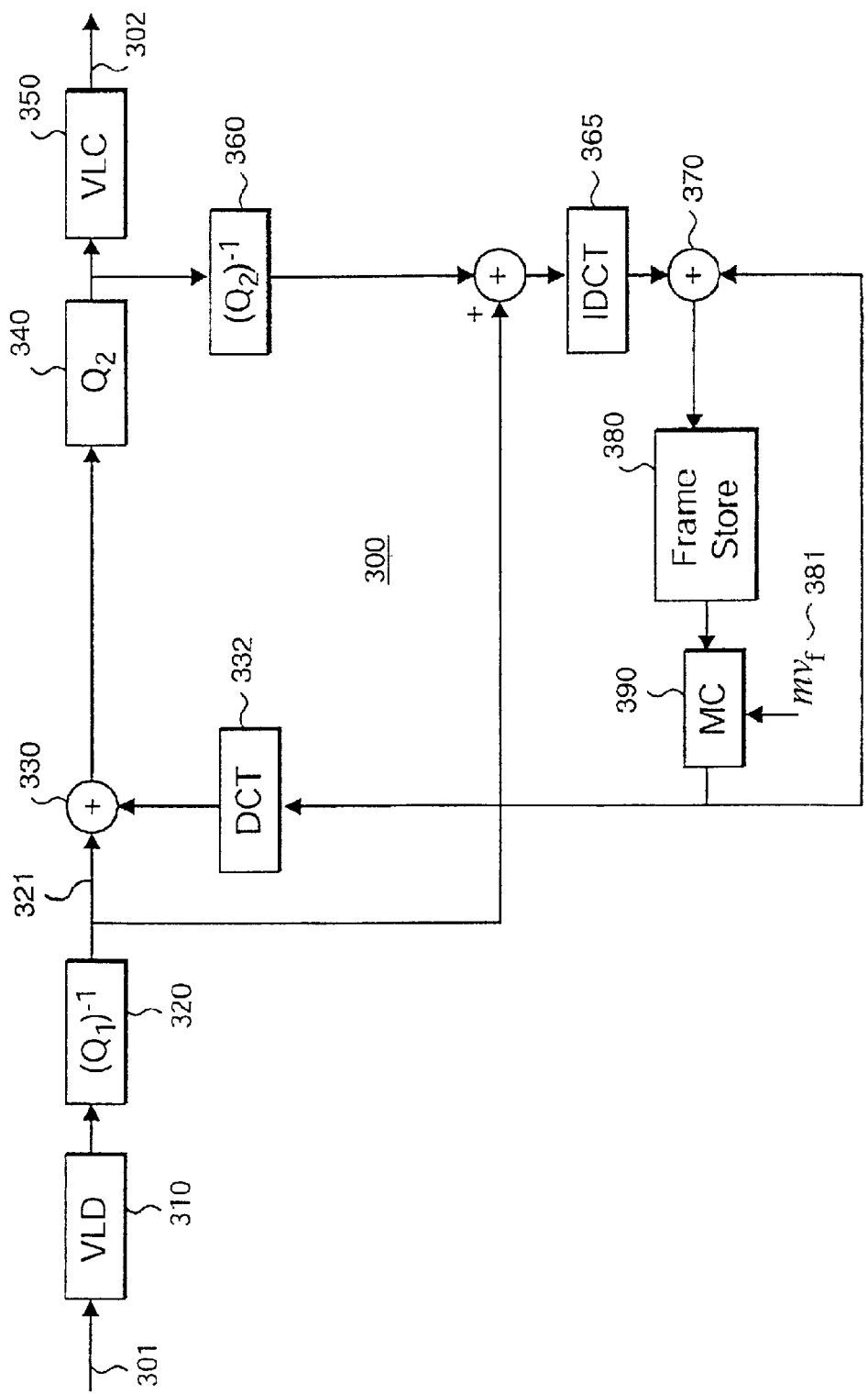
FIG. 3 is a block diagram of a prior art closed-loop transcoder for bit-rate reduction.
Figure 4:
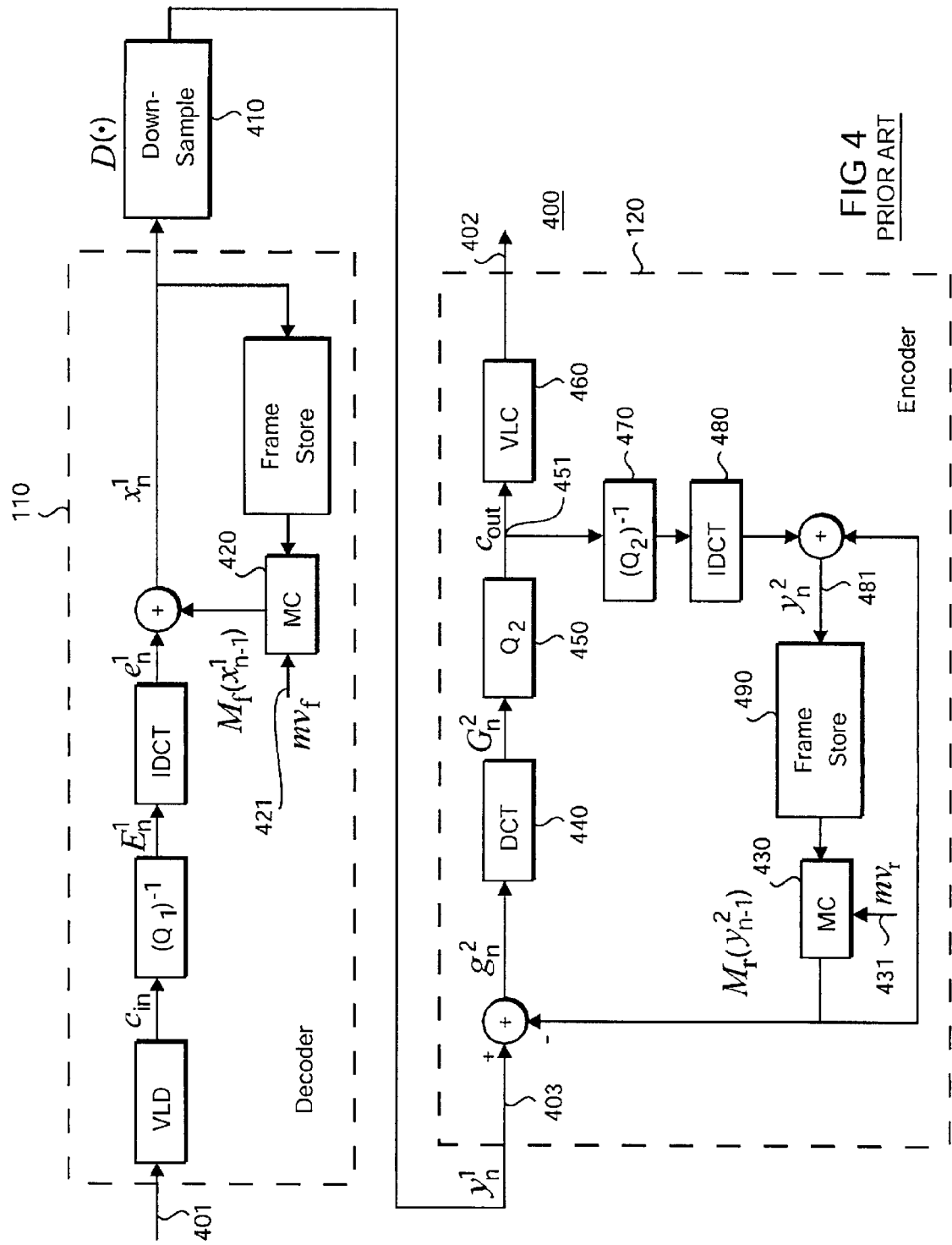
FIG. 4 is a block diagram of a prior art cascaded transcoder for spatial resolution reduction.
Figure 5:
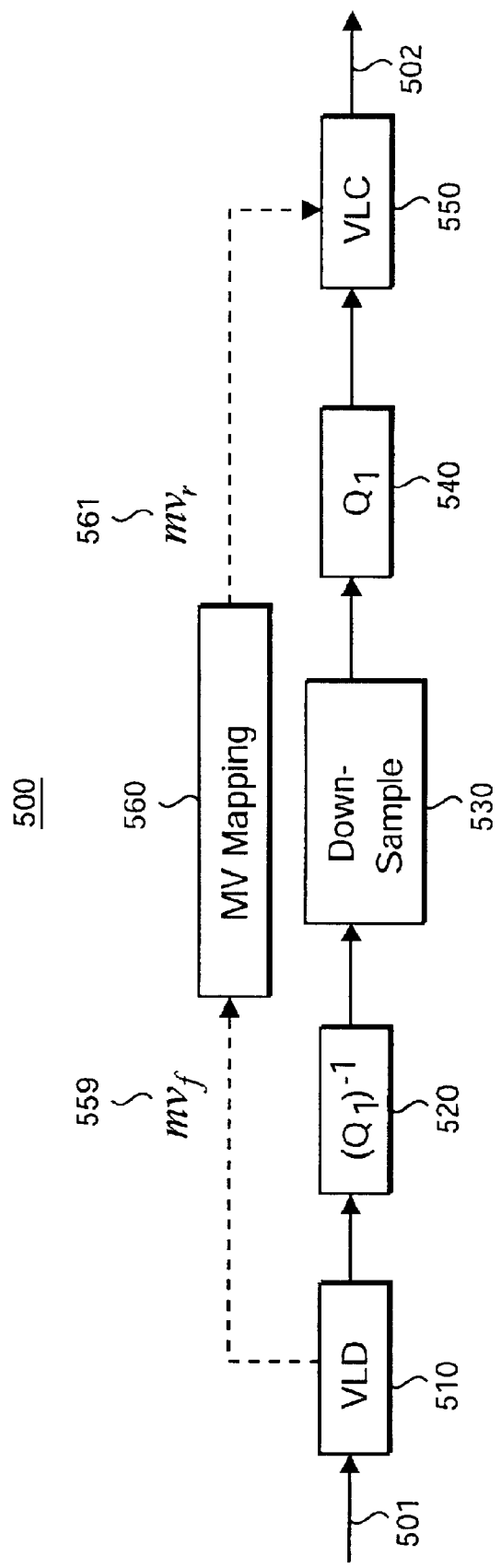
FIG. 5 is a block diagram of a prior art open-loop transcoder for spatial resolution reduction.
Figure 6:
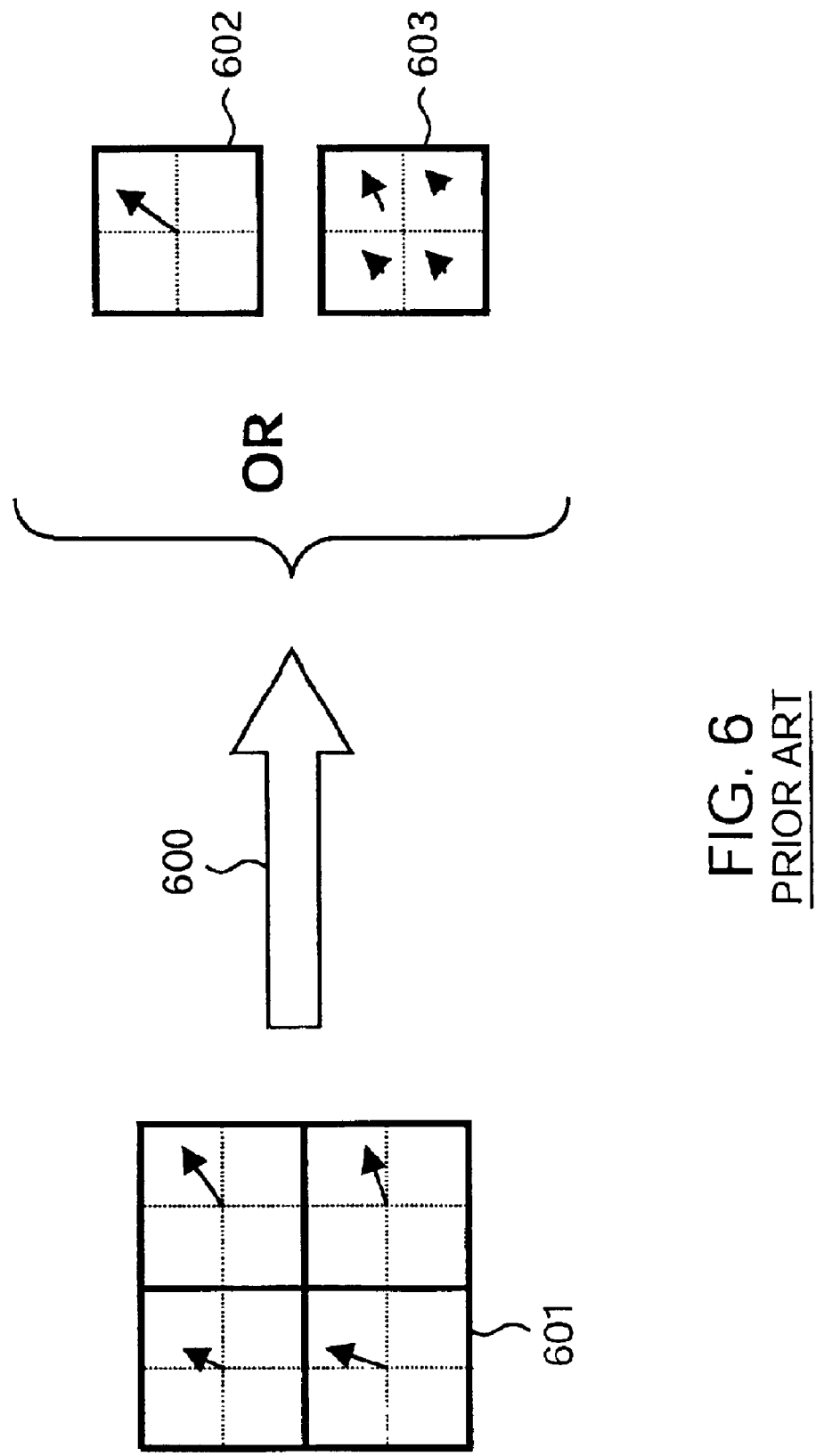
FIG. 6 is a block diagram of prior art motion vector mapping.

In order to design a transcoder with varying complexity and quality, the signals generated by the method of FIG. 4 are further described and analyzed. With regard to notation in the equations, lowercase variables indicate spatial domain signals, while uppercase variables represent the equivalent signal in the DCT domain. The subscripts on the variables indicates time, while a superscript equal to one denotes a signal that has drift and a superscript equal to two denotes a signal that is drift free. The drift is introduced through lossy processes, such as re-quantization, motion vector truncation or down-sampling. A method for drift compensation is described below.

I-frames

Because there is no motion compensated prediction for I-frames, i.e., $$x_n^1 = e_n^1,\qquad(1)$$

the signal is down-sampled 410, $$y_n^1 = D(x_n^1).\qquad(2)$$

Then, in the encoder 120, $$g_n^2 = y_n^1.\qquad(3)$$

The signal $g_n^2$ is subject to the DCT 440, then quantized 450 with quantization parameter $Q_2$. The quantized signal $c_{out}$ is variable length coded 460 and written to the transcoded bitstream 402. As part of the motion compensation loop in the encoder, $C_{out}$ is inverse quantized 470 and subject to the IDCT 480. The reduced resolution reference signal $y_n^2$ 481 is stored into the frame buffer 490 as the reference signal for future frame predictions.

P-frames

In the case of P-frames, the identity $$x_n^1 = e_n^1 + M_f(x_{n-1}^1)\qquad(4)$$

yields the reconstructed full-resolution picture. As with the I-frame, this signal is then down-converted via equation (2). Then, the reduced-resolution residual is generated according to $$g_n^2 = y_n^1 - M_r(y_{n-1}^2)\qquad(5)$$

which is equivalently expressed as, $$g_n^2 = D(e_n^1) + D(M_f(x_{n-1}^1)) - M_r(y_{n-1}^2)\qquad(6)$$

The signal given by equation (6) represents the reference signal that the architectures described by this invention approximate. It should be emphasized that the complexity in generating this reference signal is high and is desired to approximate the quality, while achieving significant complexity reduction.

Open-Loop Architecture

Give the approximations, $$y_{n-1}^2 = y_{n-1}^1\qquad(7a)$$

$$D(M_f(x_{n-1}^1)) = M_r(D(x_{n-1}^1)) = M_r(y_{n-1}^1)\qquad(7b)$$

the reduced resolution residual signal in equation (6) is expressed as, $$g_n^2 = D(e_n^1).\qquad(8)$$

The above equation suggests the open-loop architecture for a transcoder 900 as shown in FIG. 9.

In the transcoder 900, the incoming bitstream 901 signal is variable length decoded 910 to generate inverse quantized DCT coefficients 911, and full resolution motion vectors, $mv_f$ 902. The full-resolution motion vectors are mapped by the MV mapping 920 to reduced-resolution motion vectors, $mv_r$ 903. The quantized DCT coefficients 911 are inverse quantized, with quantizer $Q_1$ 930, to yield signal $E_n^1$ 931. This signal is then subject to a group of blocks processor 1300 as described in greater detail below. The output of the processor 1300 is down-sampled 950 to produce signal $G_n^2$ 951. After down-sampling, the signal is quantized with quantizer $Q_2$ 960. Finally, the reduced resolution re-quantized DCT coefficients and motion vectors are variable length coded 970 and written to the transcoded output bitstream 902.

The details and preferred embodiments of the group of blocks processor 1300 are described below, but briefly, the purpose of the group of blocks processor is to pre-process selected groups of macroblocks to ensure that the down-sampling process 950 will not generate groups of macroblocks in which its sub-blocks have different coding modes, e.g., both inter-and intra-blocks. Mixed coding modes within a macroblock are not supported by any known video coding standards.

Drift Compensation in Reduced Resolution

Given only the approximation given by equation (7b), the reduced resolution residual signal in equation (6) is expressed as, $$g_n^2 = D(e_n^1) + M_r(y_{n-1}^1 - y_{n-1}^2)\qquad(9)$$

The above equation suggests the closed-loop architecture 1000 shown in FIG. 10, which compensates for drift in the reduced resolution.

In this architecture, the incoming signal 1001 is variable length decoded 1010 to yield quantized DCT coefficients 1011 and full resolution motion vectors $mv_f$ 1012. The full-resolution motion vectors 1012 are mapped by the MV mapping 1020 to yield a set of reduced-resolution motion vectors, $mv_r$ 1021. The quantized DCT coefficients are inverse quantized 1030, with quantizer $Q_1$ to yield signal $E_n^1$ 1031. This signal is then subject to the group of blocks processor 1300 and down-sampled 1050. After down-sampling 1050, a reduced-resolution drift-compensating signal 1051 is added 1060 to the low-resolution residual 1052 in the DCT domain.

The signal 1061 is quantized with spatial quantizer $Q_2$ 1070. Finally, the reduced resolution re-quantized DCT coefficients 1071 and motion vectors 1021 are variable length coded 1080 to generate the output transcoded bitstream 1002.

The reference frame from which the reduced-resolution drift-compensating signal is generated is obtained by an inverse quantization 1090 of the re-quantizer residual $G_n^2$ 1071, which is then subtracted 1092 from the down-sampled residual $G_n^1$ 1052. This difference signal is subject to the IDCT 1094 and added 1095 to the low-resolution predictive component 1096 of the previous macroblock stored in the frame store 1091. This new signal represents the difference $(y_{n-1}^1 - y_{n-1}^2)$ 1097 and is used as the reference for low-resolution motion compensation for the current block.

Given the stored reference signal, low-resolution motion compensation 1098 is performed and the prediction is subject to the DCT 1099. This DCT-domain signal is the reduced-resolution drift-compensating signal 1051. This operation is performed on a macroblock-by-macroblock basis using the set of low-resolution motion vectors, $mv_r$ 1021.

First Method of Drift Compensation in Original Resolution

For an approximation, $$M_r(y_{n-1}^2) = D(M_f(U(y_{n-1}^2))) = D(M_f(x_{n-1}^2)), \quad (10)$$

the reduced resolution residual signal in equation (6) is expressed as, $$g_n^2 = D(e_n^1) + M_f(x_{n-1}^1 - x_{n-1}^2). \quad (11)$$

The above equation suggests the closed-loop architecture 1100 shown in FIG. 11, which compensates for drift in the original resolution bitstream.

In this architecture, the incoming signal 1001 is variable length decoded 1110 to yield quantized DCT coefficients 1111, and full resolution motion vectors, $mv_f$ 1112. The quantized DCT coefficients 1111 are inverse quantized 1130, with quantizer $Q_1$, to yield signal $E_n^1$ 1131. This signal is then subject to the group of blocks processor 1300. After group of blocks processing 1300, an original-resolution drift-compensating signal 1151 is added 1160 to the residual 1141 in the DCT domain. The signal 1162 is then down-sampled 1150, and quantized 1170 with quantizer $Q_2$. Finally, the reduced resolution re-quantized DCT coefficients 1171, and motion vectors 1121 are variable length coded 1180, and written to the transcoded bitstream 1102.

The reference frame from which the original-resolution drift-compensating signal 1151 is generated by an inverse quantization 1190 of the re-quantizer residual $G_n^2$ 1171, which is then up-sampled 1191. Here, after the up-sampling the up-sampled signal is subtracted 1192 from the original resolution residual 1161. This difference signal is subject to the IDCT 1194, and added 1195 to the original-resolution predictive component 1196 of the previous macroblock. This new signal represents the difference $(x_{n-1}^1 - x_{n-1}^2)$ 1197, and is used as the reference for motion compensation of the current macroblock in the original resolution.

Given the reference signal stored in the frame buffer 1181, original-resolution motion compensation 1198 is performed, and the prediction is subject to the DCT 1199. This DCT-domain signal is the original-resolution drift-compensating signal 1151. This operation is performed on a macroblock-by-macroblock basis using the set of original-resolution motion vectors, $mv_f$ 1121.

Second Method of Drift Compensation in Original Resolution

FIG. 11b shows an alternative embodiment of the closed loop architecture of FIG. 11a. Here, the output of the inverse quantization 1190 of the re-quantizer residual $G_n^2$ 1172 is subtracted 1192 from the reduced resolution signal before up-sampling 1191.

Both drift compensating architectures in the original resolution do not use the motion vector approximations in generating the drift compensating signal 1151. This is accomplished by the use of up-sampling 1191. The two alternative architectures mainly differ in the choice of signals that are used to generate the difference signal. In the first method, the difference signal represents error due to re-quantization and resolution conversion, while the difference signal in the second method only considers the error due to re-quantization.

Because the up-sampled signal is not considered in the future decoding of the transcoded bitstream, it is reasonable to exclude any error measured by consecutive down-sampling and up-sampling in the drift compensation signal. However, up-sampling is still employed for two reasons: to make use of the full-resolution motion vectors 1121 to avoid any further approximation, and so that the drift compensating signal is in the original resolution and can be added 1160 to the incoming residual 1161 before down-sampling 1150.

Mixed Block Processor

The purpose of the group of blocks processor 1300 is to pre-process selected macroblocks to ensure that the down-sampling process do not generate macroblocks in which its sub-blocks have different coding modes, e.g., inter- and intra-blocks. Mixed coding modes within macroblocks are not supported by any known video coding standards.

Figure 12:
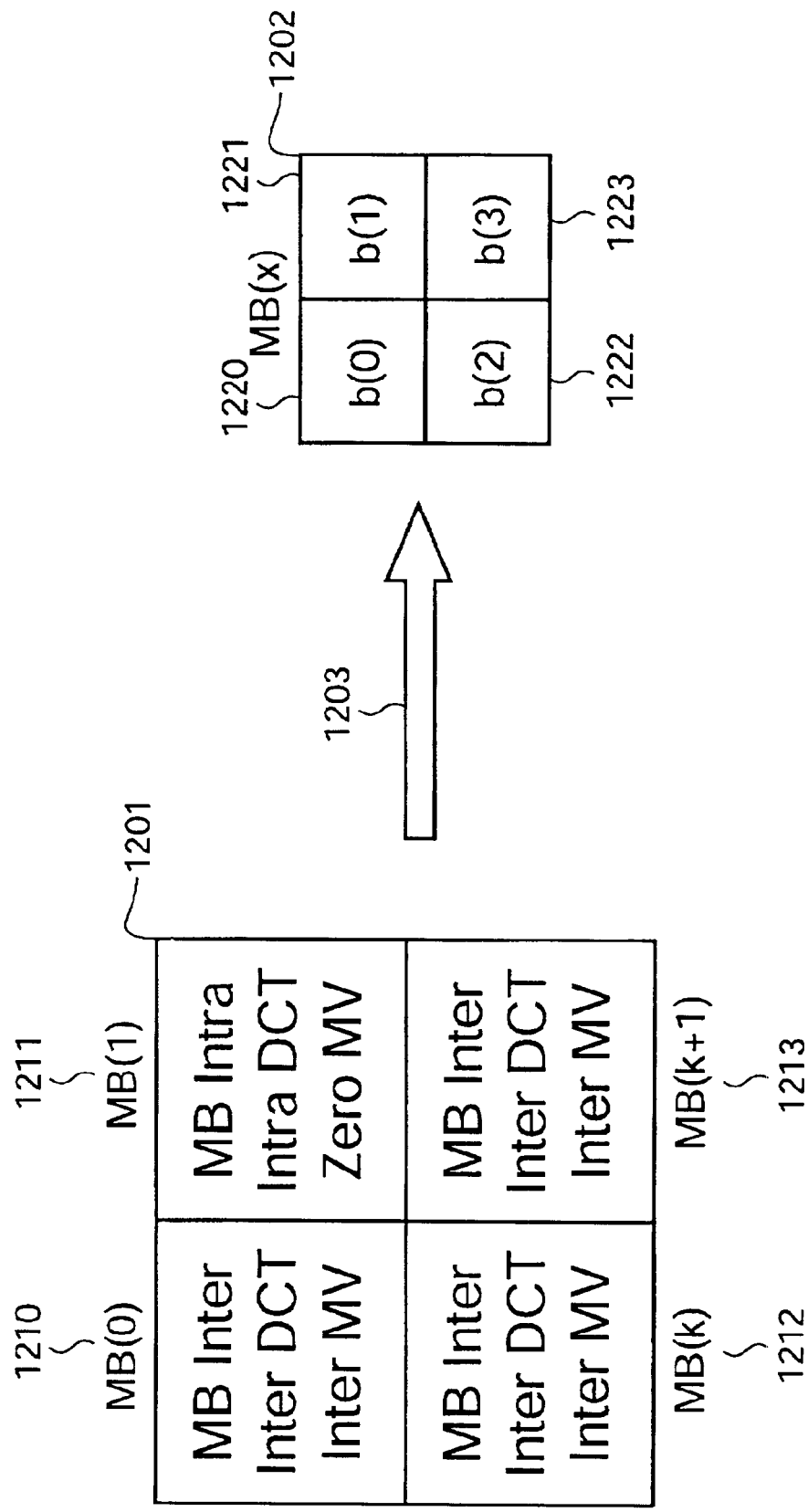
FIG. 12 is an example of a group of macroblocks containing macroblock modes, DCT coefficient data, and corresponding motion vector data.
Figure 13:
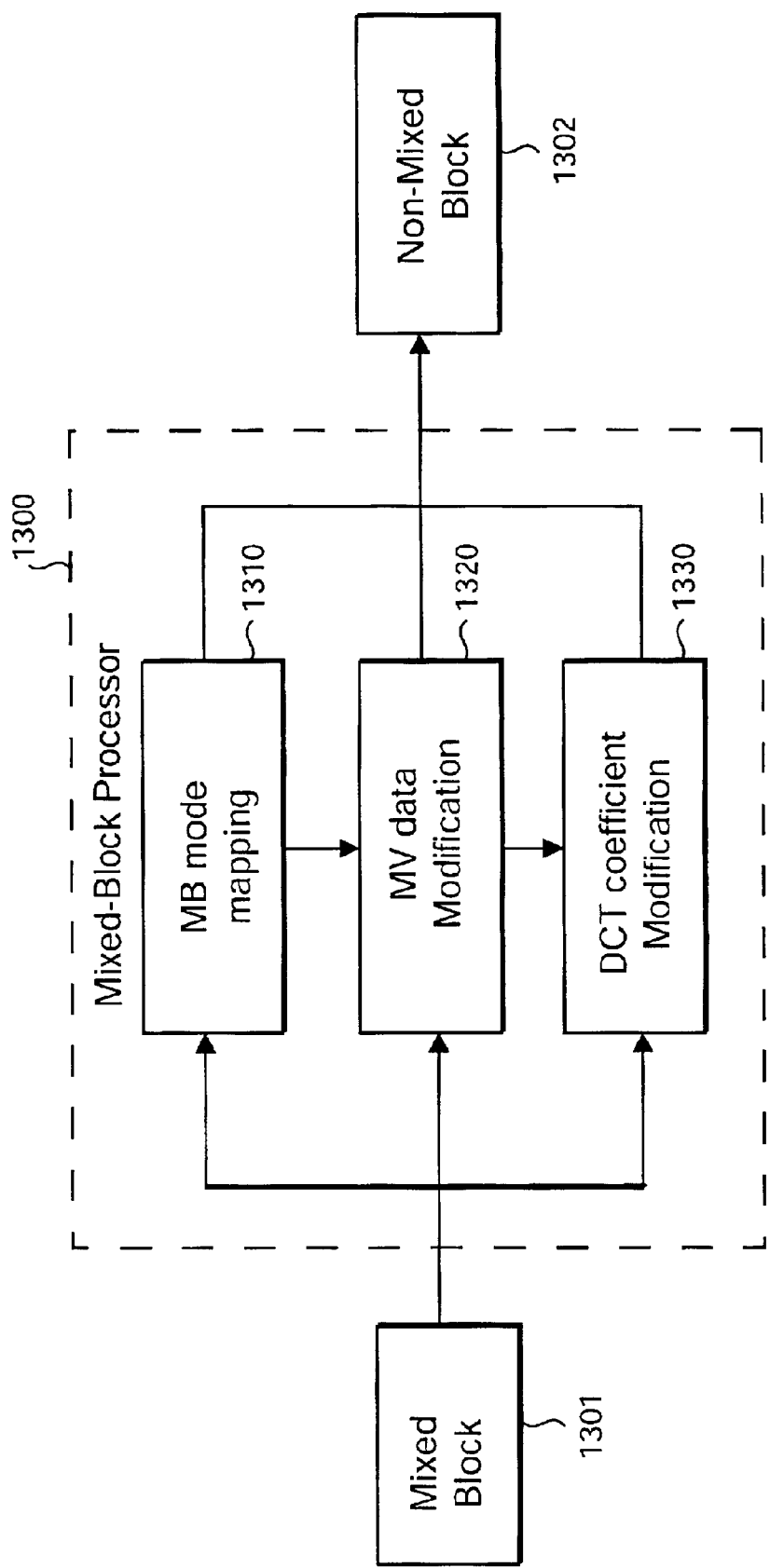
FIG. 13 is a block diagram of a group of blocks processor according to the invention.

FIG. 12 shows an example of a group of macroblocks 1201 that can lead to a group of blocks 1202 in the reduced resolution after transcoding 1203. Here, there are three inter-mode blocks, and one intra-mode block. Note, the motion vector (MV) for the intra-mode block is zero. Determining whether a particular group of blocks is a mixed group, or not, depends only on the macroblock mode. The group of blocks processor 1300 considers groups of four macroblocks 1201 that form a single macroblock 1202 in the reduced resolution. In other words, for the luminance component, MB(0) 1210 corresponds to sub-block b(0) 1220 in the reduced resolution macroblock 1202, and similarly, MB(1) 1211 will correspond to b(1) 1221, MB(k) 1212 corresponds to b(2) 1222, and MB(k+1) 1213 corresponds to b(3) 1223, where k is the number of macroblocks per row in the original resolution. Chrominance components are handled in a similar manner that is consistent with luminance modes.

A group of MB modes determine whether the group of blocks processor 1300 should process a particular MB. The group of blocks is processed if the group contains at least one intra-mode block, and at least one inter-mode block. After a macroblock is selected, its DCT coefficients and motion vector data are subject to modification.

FIG. 1300 shows the components of the group of blocks processor 1300. For a selected group of mixed blocks 1301, the group of blocks processor performs mode mapping 1310, motion vector modification 1320, and DCT coefficient modification 1330 to produce an output non-mixed block 1302. Given that the group of blocks 1301 has been identified, the modes of the macroblocks are modified so that all macroblocks are identical. This is done according to a pre-specified strategy to match the modes of each sub-block in a reduced resolution block.

In accordance with the chosen mode mapping, the MV data are then subject to modification 1320. Possible modifications that agree with corresponding mode mappings are described in detail below for FIGS. 14A–C. Finally, given both the new MB mode and the MV data, the corresponding DCT coefficients are also modified 1330 to agree with the mapping.

Figure 14A:
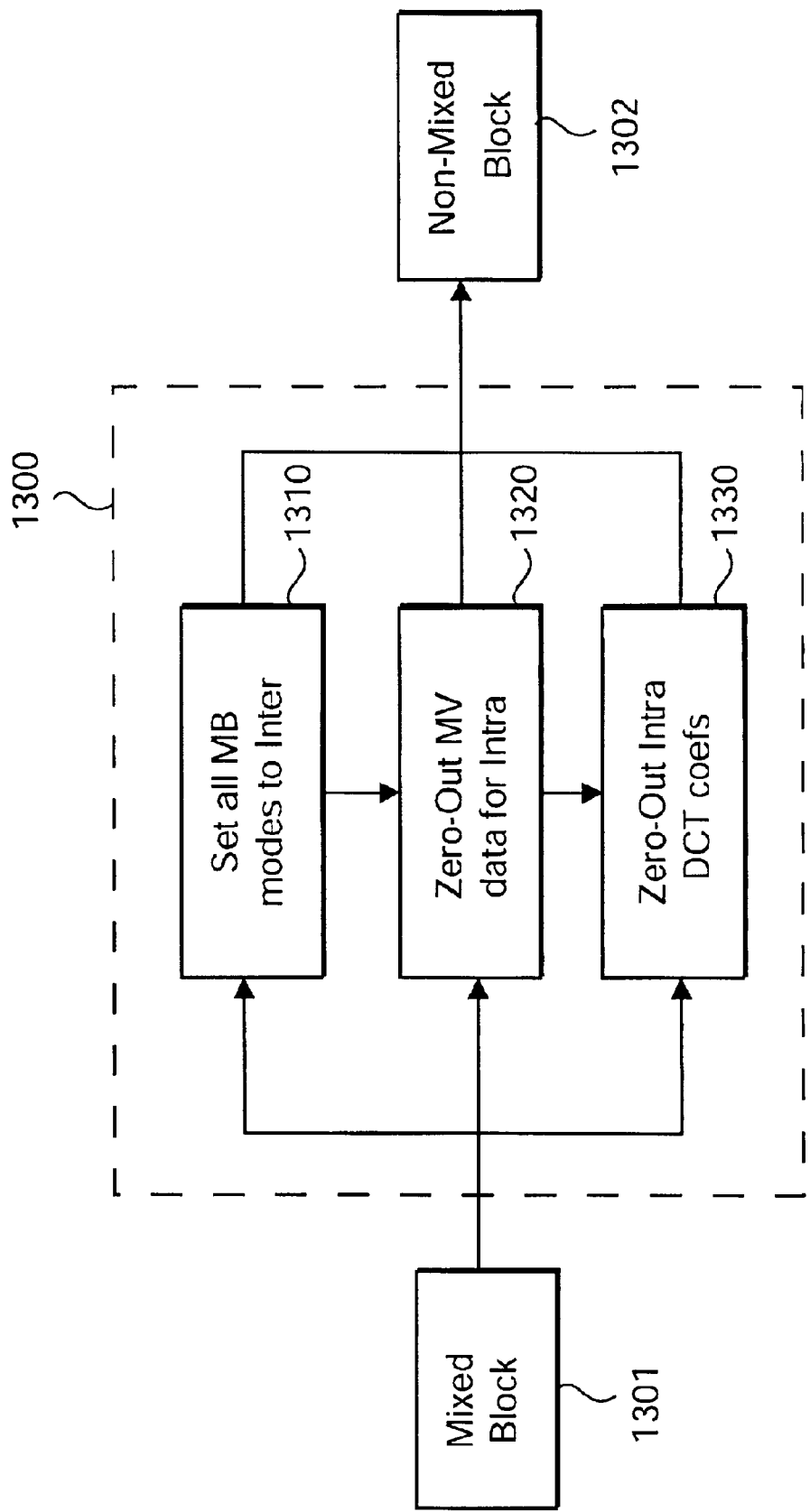
FIG. 14A is a block diagram of a first method for group of blocks processing according to the invention.

In a first embodiment of the group of blocks processor as shown in FIG. 14A, the MB modes of the group of blocks 1301 are modified to be inter-mode by the mode mapping 1310. Therefore, the MV data for the intra-blocks are reset to zero by the motion vector processing, and the DCT coefficients corresponding to intra-blocks are also reset to zero by the DCT processing 1330. In this way, such sub-blocks that have been converted are replicated with data from the corresponding block in the reference frame.

Figure 14B:
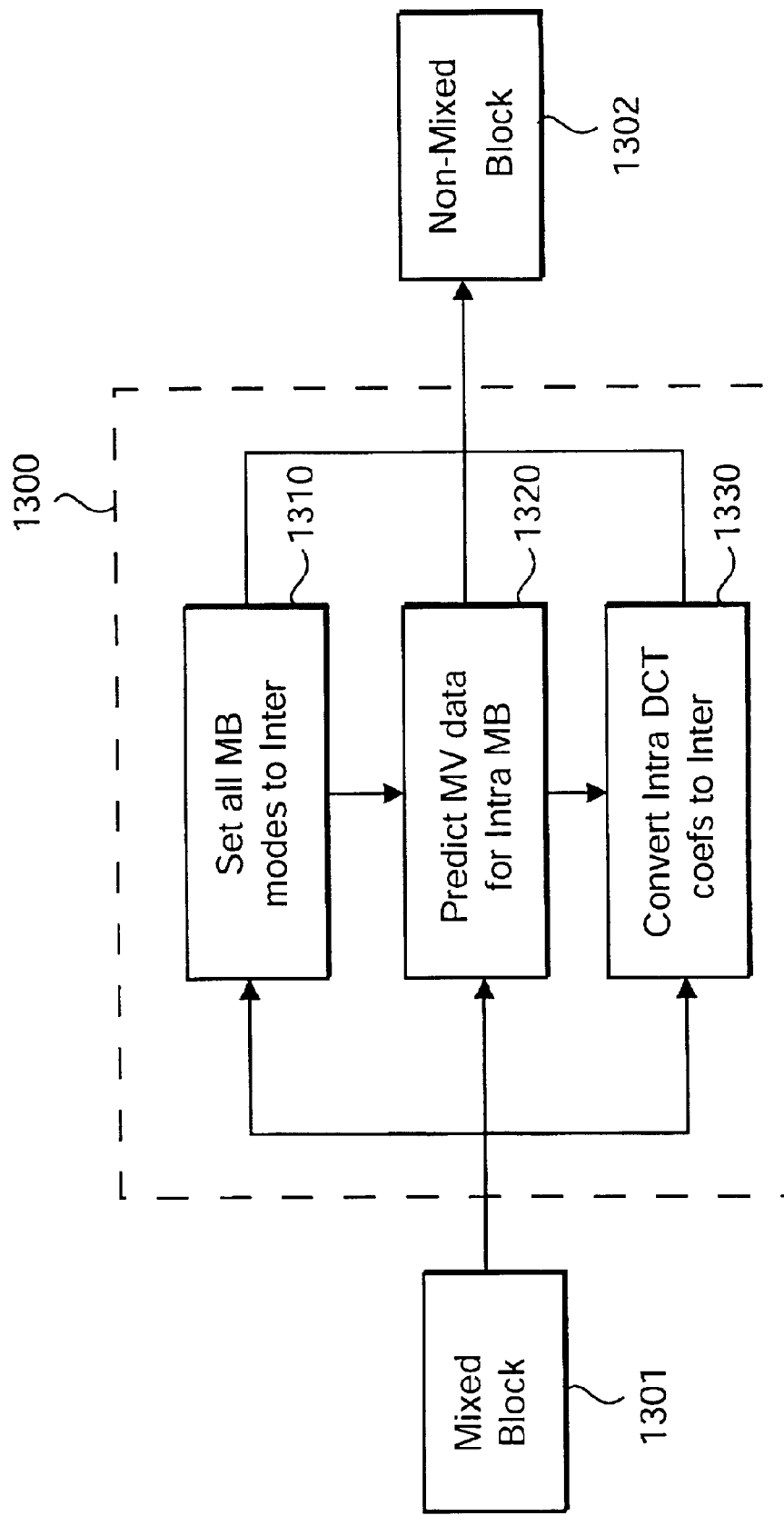
FIG. 14B is block diagram of a second method for group of blocks processing according to the invention.

In a second embodiment of the group of blocks processor as shown in FIG. 14B, the MB modes of the groups of mixed block are modified to be to inter-mode by the mapping 1310. However, in contrast to the first preferred embodiment, the MV data for intra-MB's are predicted. The prediction is based on the data in neighboring blocks, which can include both texture and motion data. Based on this predicted motion vector, a new residual for the modified block is calculated. The final step 1320 resets the inter-DCT coefficients to intra-DCT coefficients.

Figure 14C:
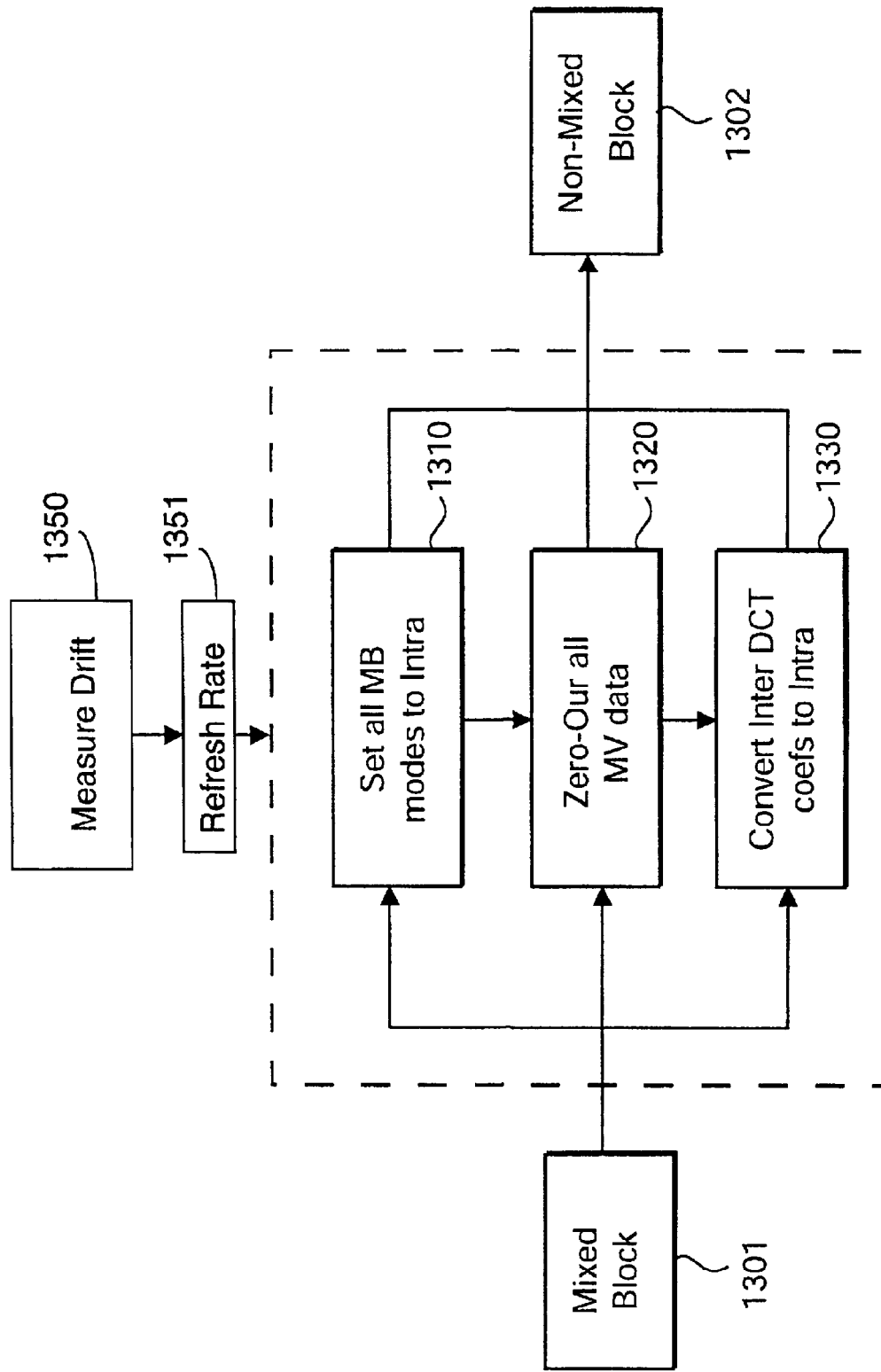
FIG. 14C is a block diagram of a third method for a group of blocks processing according to the invention.

In a third embodiment shown in FIG. 14C, the MB modes of the grouped of blocks are modified 1310 to intra-mode. In this case, there is no motion information associated with the reduced-resolution macroblock, therefore all associated motion vector data are reset 1320 to zero. This is necessary to perform in the transcoder because the motion vectors of neighboring blocks are predicted from the motion of this block. To ensure proper reconstruction in the decoder, the MV data for the group of blocks must be reset to zero in the transcoder. The final step 1330 generates intra-DCT coefficients to replace the inter-DCT coefficients, as above.

It should be noted that to implement the second and third embodiments described above, a decoding loop that reconstructs to full-resolution can be used. This reconstructed data can be used as a reference to convert the DCT coefficients between intra- and inter-modes, or inter- and intra-modes. However, the use of such a decoding loop is not required. Other implementations can perform the conversions within the drift compensating loops.

For a sequence of frames with a small amount of motion, and a low-level of detail the low complexity strategy of FIG. 14A can be used. Otherwise, the equally complex strategies of either FIG. 14b or FIG. 14c should be used. The strategy of FIG. 14c provides the best quality.

Drift Compensation with Block Processing

It should be noted that the group of block processor 1300 can also be used to control or minimize drift. Because intra coded blocks are not subject to drift, the conversion of inter-coded blocks to intra-coded blocks lessens the impact of drift.

As a first step 1350 of FIG. 14C, the amount of drift in the compressed bitstream is measured. In the closed-loop architectures, the drift can be measured according to the energy of the difference signal generated by 1092 and 1192 or the drift compensating signal stored in 1091 and 1191. Computing the energy of a signal is a well-known method. The energy that is computed accounts for various approximations, including re-quantization, down-sampling and motion vector truncation.

Another method for computing the drift, which is also applicable to open-loop architectures, estimates the error incurred by truncated motion vectors. It is known that half-pixel motion vectors in the original resolution lead to large reconstruction errors when the resolution is reduced. Full-pixel motion vectors are not subject to such errors because they can still be mapped correctly to half-pixel locations. Given this, one possibility to measure the drift is to record the percentage of half-pixel motion vectors.

However, because the impact of the motion vector approximation depends on the complexity of the content, another possibility is that the measured drift be a function of the residual components that are associated with blocks having half-pixel motion vectors.

The methods that use the energy of the difference signal and motion vector data to measure drift can be used in combination, and can also be considered over sub-regions in the frame. Considering sub-regions in the frame is advantageous because the location of macroblocks that benefit most by drift compensation method can be identified. To use these methods in combination, the drift is measured by the energy of the difference signal, or drift compensating signal for macroblocks having half-pixel motion vectors in the original resolution.

As a second step, the measured value of drift is translated into an "intra refresh rate" 1351 that is used as input to the group of blocks processor 1300.

Controlling the percentage of intra-coded blocks has been considered in the prior art for encoding of video for error-resilient transmission, see for example "Analysis of Video Transmission over Lossy Channels," Journal of Selected Areas of Communications, by Stuhlmuller, et al, 2000. In that work, a back-channel from the receiver to the encoder is assumed to communicate the amount of loss incurred by the transmission channel, and the encoding of intra-coded blocks is performed directly from the source to prevent error propagation due to lost data in a predictive coding scheme.

In contrast, the invention generates new intra-blocks in the compressed domain for an already encoded video, and the conversion from inter- to intra-mode is accomplished by the group of blocks processor 1300. If the drift exceeds a threshold amount of drift, the group of blocks processor 1300 of FIG. 14c is invoked to convert an inter-mode block to an intra-mode block. In this case, the conversion is be performed at a fixed and pre-specified intra refresh rate. Alternatively, conversion can be done at an intra refresh rate that is proportional to the amount of drift measured. Also, rate-distortion characteristics of the signal can be taken into account to make appropriate trade-offs between the intra refresh rate and quantizers used for coding intra and inter blocks.

It should be noted that the invention generates new intra-blocks in the compressed domain, and this form of drift compensation can be performed in any transcoder with or without resolution reduction.

Down-Sampling

Any down-sampling method can be used by the transcoder according to the invention. However, the preferred down-sampling method is according to U.S. Pat. No. 5,855,151, "Method and apparatus for down-converting a digital signal," issued on Nov. 10, 1998 to Sun et al, incorporated herein by reference.

The concept of this down-sampling method is shown in FIG. 15A. A group includes four $2^N \times 2^N$ DCT blocks 1501. That is, the size of the group is $2^{N+1} \times 2^{N+1}$. A "frequency synthesis" or filtering 1510 is applied to the group of blocks to generate a single $2^N \times 2^N$ DCT block 1511. From this synthesized block, a down-sampled DCT block 1512 can be extracted.

This operation has been described for the DCT domain using 2D operations, but the operations can also be performed using separable 1D filters. Also, the operations can be completely performed in the spatial domain. Equivalent spatial domain filters can be derived using the methods described in U.S. patent application Ser. No. 09/035,969, "Three layer scalable decoder and method of decoding," filed on Mar. 6, 1998 by Vetro et al, incorporated herein by reference.

The main advantage of using the down-sampling method in the transcoder according to the invention is that correct dimension of sub-blocks in the macroblock are obtained directly, e.g., from four 8×8 DCT blocks, a single 8×8 block can be formed. On the other hand, alternate prior art methods for down-sampling produce down-sampled data in a dimension that does not equal the required dimension of the outgoing sub-block of a macroblock, e.g., from four 8×8 DCT blocks, a four 4×4 DCT blocks is obtained. Then, an additional step is needed to compose a single 8×8 DCT block.

The above filters are useful components to efficiently implement the architecture shown in FIG. 11 that requires up-sampling. More generally, the filters derived here can be applied to any system that requires arithmetic operations on up-sampled DCT data, with or without resolution reduction or drift compensation.

Up-Sampling

Any means of prior art up-sampling can be used in the present invention. However, Vetro, et al., in U.S. Patent Application "Three layer scalable decoder and method of decoding," see above, states that the optimal up-sampling method is dependent on the method of down-sampling. Therefore, the use an up-sampling filters $x_u$ that corresponds to the down-sampling filters $x_d$ is preferred, where the relation between the two filters is given by, $$x_u = x_d^T (x_d x_d^T)^{-1} \quad (12)$$

There are two problems associated with the filters derived from the above equations. First, the filters are only applicable in the spatial domain filters because the DCT filters are not invertable. But, this is a minor problem because the corresponding spatial domain filters can be derived, then converted to the DCT-domain.

However, the second problem is that the up-sampling filters obtained in this way correspond to the process shown in FIG. 15B. In this process, for example, an $2^N \times 2^N$ block 1502 is up-sampled 1520 to a single $2^{N+1} \times 2^{N+1}$ block 1530. If up-sampling is performed entirely in the spatial domain, there is no problem. However, if the up-sampling is performed in the DCT domain, one has a $2^{N+1} \times 2^{N+1}$ DCT block to deal with, i.e., with one DC component. This is not suitable for operations that require the up-sampled DCT block to be in standard MB format, i.e., four $2^N \times 2^N$ DCT blocks, where N is 4. That is, the up-sampled blocks have the same format or dimensionality as the original blocks, there just are more of them.

The above method of up-sampling in the DCT domain is not suitable for use in the transcoder described in this invention. In FIG. 11a, up-sampled DCT data are subtracted from DCT data output from the mixed block processor 1300. The two DCT data of the two blocks must have the same format. Therefore, a filter that can perform the up-sampling illustrated in FIG. 15C is required. Here, the single $2^N \times 2^N$ block 1502 is up-sampled 1540 to four $2^N \times 2^N$ blocks 1550. Because such a filter has not yet been considered and does not exist in the known prior art, an expression for the 1D case is derived in the following. With regard to notation in the following equations, lowercase variables indicate spatial domain signals, while uppercase variables represent the equivalent signal in the DCT domain.

Figure 16:
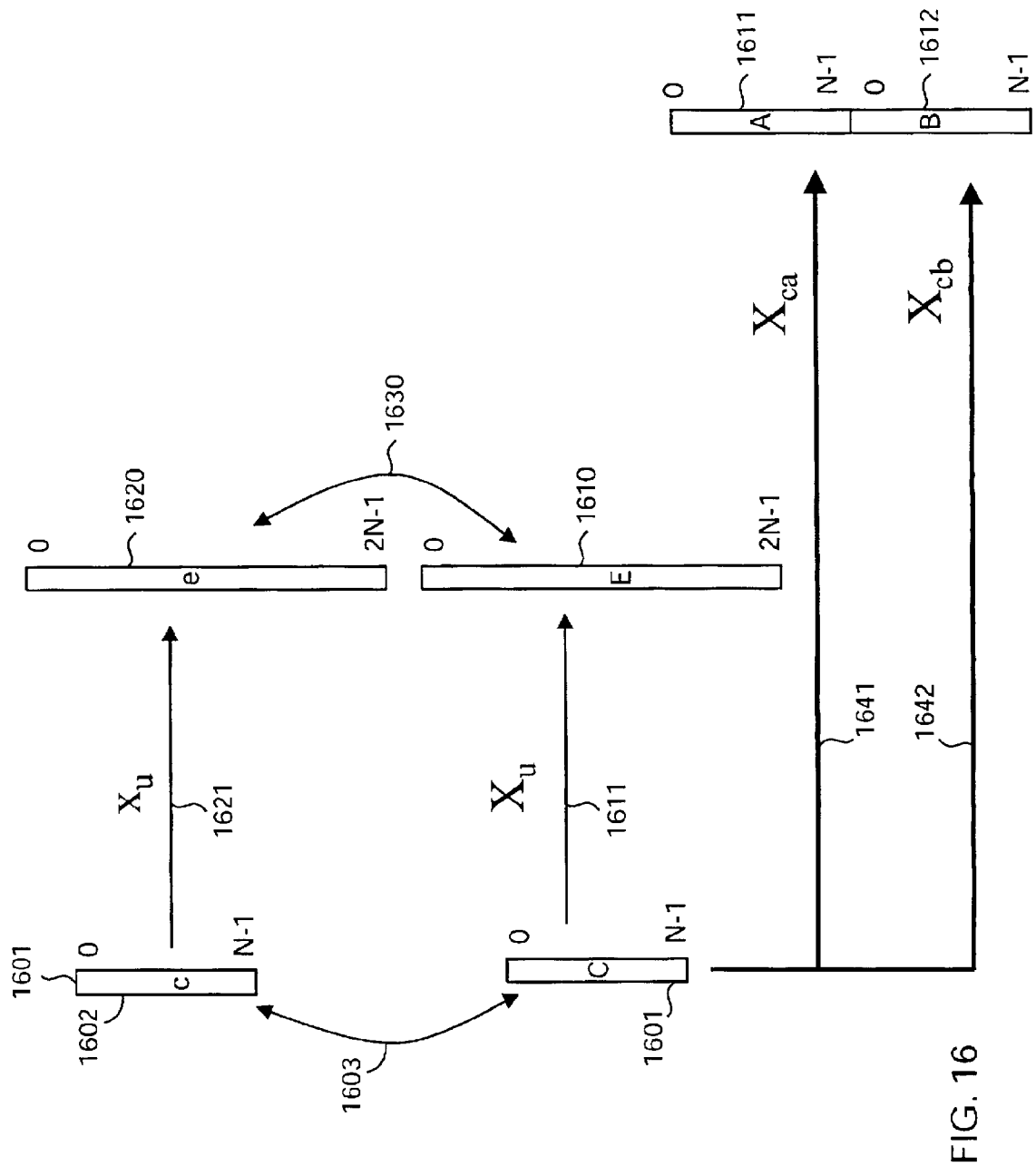
FIG. 16 is a diagram of up-sampling in the DCT domain according to the invention.

As illustrated in FIG. 16, C 1601 represents the DCT block to be up-sampled in the DCT domain, and c 1602 represents the equivalent block in the spatial domain. The two blocks are related to one another through the definition of the N-pt DCT and IDCT 1603, see Rao and Yip, "Discrete Cosine Transform: Algorithms, Advantages and Applications," Academic, Boston, 1990. For convenience, the expressions are also given below.

The DCT definition is $$C_q = z_q \sqrt{\frac{2}{N}} \sum_{i=0}^{N-1} c_i \cos\left(\frac{(2i+1)q\pi}{2N}\right), \text{ and} \quad (13)$$

the IDCT definition is $$c_j = \sqrt{\frac{2}{N}} \sum_{q=0}^{N-1} z_q C_q \cos\left(\frac{(2j+1)q\pi}{2N}\right), \quad (14)$$

where $$z_q = \begin{cases} 1/\sqrt{2}; & q = 0 \\ 1; & q \neq 0. \end{cases} \quad (15)$$

Given the above, block E 1610 represents the up-sampled DCT block based on filtering C with $X_u$ 1611, and e represents the up-sampled spatial domain block-based on filtering c with the $x_u$ 1621 given by equation (12). Note that e and E are related through a 2N-pt DCT/IDCT 1630. The input-output relations of the filtered input are given by, $$E_k = \sum_{q=0}^{N-1} C_q X_u(k, q); \quad 0 \leq k \leq 2N - 1, \text{ and} \quad (16a)$$

$$e_i = \sum_{j=0}^{N-1} c_j x_u(i, j); \quad 0 \leq i \leq N - 1. \quad (16b)$$

As shown in FIG. 16, the desired DCT blocks are denoted by A 1611 and B 1612. The aim of this derivation is to derive filters $X_{ca}$ 1641 and $X_{cb}$ 1642 that can be used to compute A and B directly from C, respectively.

As the first step, equation (14) is substituted into equation (16b). The resulting expression is the spatial domain output e as a function of the DCT input C, which is given by, $$e_i = \sum_{q=0}^{N-1} C_q \left[\sqrt{\frac{2}{N}} z_q \sum_{j=0}^{N-1} x_u(i, j) \cdot \cos\left(\frac{(2j+1)q\pi}{2N}\right)\right]. \quad (17)$$

To express A and B in terms of C using equation (17), the spatial domain relationship between a, b and e is $$a_i = e_i; \quad 0 \leq i \leq N-1$$

$$b_{i-N} = e_I; \quad N \leq I \leq 2N-1' \quad (18)$$

where i in the above denotes the spatial domain index. The DCT domain expression for a is given by, $$A_k = z_k \sqrt{\frac{2}{N}} \sum_{i=0}^{N-1} a_i \cos\left(\frac{(2i+1)k\pi}{2N}\right). \quad (19)$$

Using equations (17)–(19) gives, $$A_k = \sum_{q=0}^{N-1} C_q \left[ \frac{2}{N} z_k z_q \sum_{i=0}^{N-1} \cos\left(\frac{(2i+1)k\pi}{2N}\right) \sum_{j=0}^{N-1} x_u(i,j) \cos\left(\frac{(2j+1)q\pi}{2N}\right) \right] \quad (20)$$

which is equivalently expressed as $$A_k = \sum_{q=0}^{N-1} C_q X_{ca}(k,q) \quad (21)$$

where $$X_{ca}(k,q) = \frac{2}{N} z_k z_q \sum_{i=0}^{N-1} \cos\left(\frac{(2i+1)k\pi}{2N}\right) \sum_{j=0}^{N-1} x_u(i,j) \cos\left(\frac{(2j+1)q\pi}{2N}\right). \quad (22)$$

Similarly, $$B_k = \sum_{q=0}^{N-1} C_q \quad (23)$$

$$\left[ \frac{2}{N} z_k z_q \sum_{i=0}^{N-1} \cos\left(\frac{(2i+1)k\pi}{2N}\right) \sum_{j=0}^{N-1} x_u(i+N,j) \cos\left(\frac{(2j+1)q\pi}{2N}\right) \right]$$

which is equivalently expressed as $$B_k = \sum_{q=0}^{N-1} C_q X_{cb}(k,q) \quad (24)$$

where $$X_{cb}(k,q) = \quad (25)$$

$$\frac{2}{N} z_k z_q \sum_{i=0}^{N-1} \cos\left(\frac{(2i+1)k\pi}{2N}\right) \sum_{j=0}^{N-1} x_u(i+N,j) \cos\left(\frac{(2j+1)q\pi}{2N}\right).$$

The above filters can then be used to up-sample a single block of a given dimension to a larger number of blocks, each having the same dimension as the original block. More generally, the filters derived here can be applied to any system that requires arithmetic operations on up-sampled DCT data.

To implement the filters given by equations (22) and (25), it is noted that each expression provides a kxq matrix of filter taps, where k is the index of an output pixel and q is the index of an input pixel. For 1D data, the output pixels are computed as a matrix multiplication. For 2D data, two steps are taken. First, the data is up-sampled in a first direction, e.g., horizontally. Then, the horizontally up-sampled data is up-sampled in the second direction, e.g., vertically. The order of direction for up-sampling can be reversed without having any impact on the results.

For horizontal up-sampling, each row in a block is operated on independently and treated as an N-dimensional input vector. Each input vector is filtered according to equations (21) and (24). The output of this process will be two standard DCT blocks. For vertical up-sampling, each column is operated on independently and again treated as an N-dimensional input vector. As with the horizontal up-sampling, each input vector is filtered according to equations (21) and (24). The output of this process will be four standard DCT blocks as shown in FIG. 15C.

Syntax Conversion

As stated for the above applications of the transcoder according to the invention, one of the key applications for this invention is MPEG-2 to MPEG-4 conversion. Thus far, the focus is mainly on the architectures used for drift compensation when transcoding to a lower spatial resolution and additional techniques that support the conversion to lower spatial resolutions.

However, syntax conversion between standard coding schemes is another important issue. Because we believe that this has been described by patent applications already pending, we do not provide any further details on this part.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for up-sampling a compressed bitstream, comprising:
    partially decoding the compressed bitstream to produce a plurality of macroblocks, each macroblock having DCT coefficients according to a predetermined dimensionality of the macroblock; and
    applying a plurality of DCT filters to the DCT coefficients of each macroblock to generate a plurality of up-sampled macroblocks for each macroblock, each up-sampled macroblock including up-sampled DCT coefficients, there being one up-sampled macroblock generated by each filter, each up-sampled macroblock having the predetermined dimensionality.

2. The method of claim 1 wherein the macroblock and each up-sampled macroblock has $2^N$ up-sampled DCT coefficients arranged in rows and columns, where N is the predetermined dimensionality.

3. The method of claim 1 wherein further comprising:
    applying two DCT filters to the rows of DCT coefficients of each macroblock to generate two horizontally arranged up-sampled macroblocks; and
    applying the two DCT filters to the columns of the up-sampled DCT coefficients of each horizontally arranged up-sampled macroblock to generate two vertically arranged up-sampled blocks for each horizontally arranged up-sampled macroblock for a total of four up-sampled macroblocks.

4. The method of claim 3 wherein the up-sampled DCT coefficients of the up-sampled macroblocks are determined by matrix multiplications.

5. The method of claim 4 wherein each filter is a form of a kxq matrix of filter taps, where k is an index of a particular up-sampled DCT coefficient and q is an index of a particular DCT coefficient.

6. An apparatus for up-sampling a compressed bitstream, comprising:
    means for partially decoding the compressed bitstream to produce a plurality of macroblocks, each macroblock having DCT coefficients according to a predetermined dimensionality of the macroblock; and
    means for applying a plurality of DCT filters to the DCT coefficients of each macroblock to generate a plurality of up-sampled macroblocks for each macroblock, each up-sampled macroblock including up-sampled DCT coefficients, there being one up-sampled macroblock generated by each filter, each up-sampled macroblock having the predetermined dimensionality.

* * * * *